United States Patent
Sakashita

(10) Patent No.: US 8,529,654 B2
(45) Date of Patent: *Sep. 10, 2013

(54) CLEANING UNIT OF AIR CONDITIONER

(75) Inventor: Akihiko Sakashita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 169 days.

This patent is subject to a terminal disclaimer.

(21) Appl. No.: 12/809,382

(22) PCT Filed: Dec. 9, 2008

(86) PCT No.: PCT/JP2008/003676
§ 371 (c)(1),
(2), (4) Date: Jun. 18, 2010

(87) PCT Pub. No.: WO2009/078140
PCT Pub. Date: Jun. 25, 2009

(65) Prior Publication Data
US 2011/0120066 A1    May 26, 2011

(30) Foreign Application Priority Data

Dec. 19, 2007   (JP) ................. 2007-327925

(51) Int. Cl.
*B01D 46/38* (2006.01)

(52) U.S. Cl.
USPC ............ 55/295; 55/385.2; 55/428.1; 55/429; 55/471; 165/4

(58) Field of Classification Search
USPC ............... 55/282–305, 428–433, 467–473, 55/490–519; 165/5, 95, 303, DIG. 11, DIG. 85; 62/303
See application file for complete search history.

(56) References Cited

U.S. PATENT DOCUMENTS

| | | | | |
|---|---|---|---|---|
| 3,757,496 A | * | 9/1973 | Berg ................................ | 55/293 |
| 2004/0000160 A1 | * | 1/2004 | Takashima et al. ............. | 62/317 |
| 2006/0070358 A1 | * | 4/2006 | Oda et al. ........................ | 55/295 |

FOREIGN PATENT DOCUMENTS

| | | |
|---|---|---|
| CN | 1754070 A | 3/2006 |
| CN | 1892120 A | 1/2007 |
| EP | 1 741 992 A2 | 1/2007 |
| JP | 2005-83612 A | 3/2005 |
| JP | 2005-308274 A | 11/2005 |
| JP | 2007-038215 A | 2/2007 |
| JP | 2007-40689 A | 2/2007 |
| JP | 2007-232242 A | 9/2007 |
| JP | 2007-309581 A | 11/2007 |
| JP | 2007-309583 A | 11/2007 |
| JP | 2007-309584 A | 11/2007 |
| WO | WO 2004/079270 A1 | 9/2004 |

* cited by examiner

*Primary Examiner* — Duane Smith
*Assistant Examiner* — Thomas McKenzie
(74) *Attorney, Agent, or Firm* — Birch, Stewart, Kolasch & Birch, LLP.

(57) ABSTRACT

An objective of the invention is to obtain a cleaning unit which allows a cleaning mechanism, such as a dust removal device, for an air filter to be easily mounted in an indoor unit of an air conditioner that has an air filter on the intake side of an indoor fan. The cleaning unit includes: a chamber casing (101) connected to a room side of an indoor main unit (10) having an indoor heat exchanger (22) and an indoor fan (21) which draws air from the room and blows the air to the indoor heat exchanger (22); an air filter (30) provided in the chamber casing (101) on an intake side of the indoor fan (21); and a dust removal device (50) configured to remove dust captured by the air filter (30).

12 Claims, 21 Drawing Sheets

FIG. 16
(A)
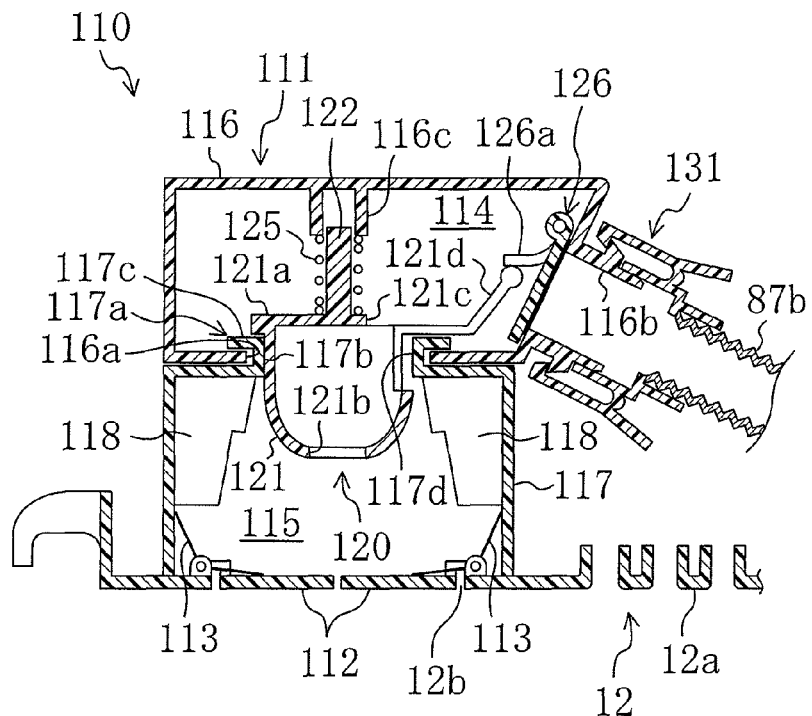
(B)
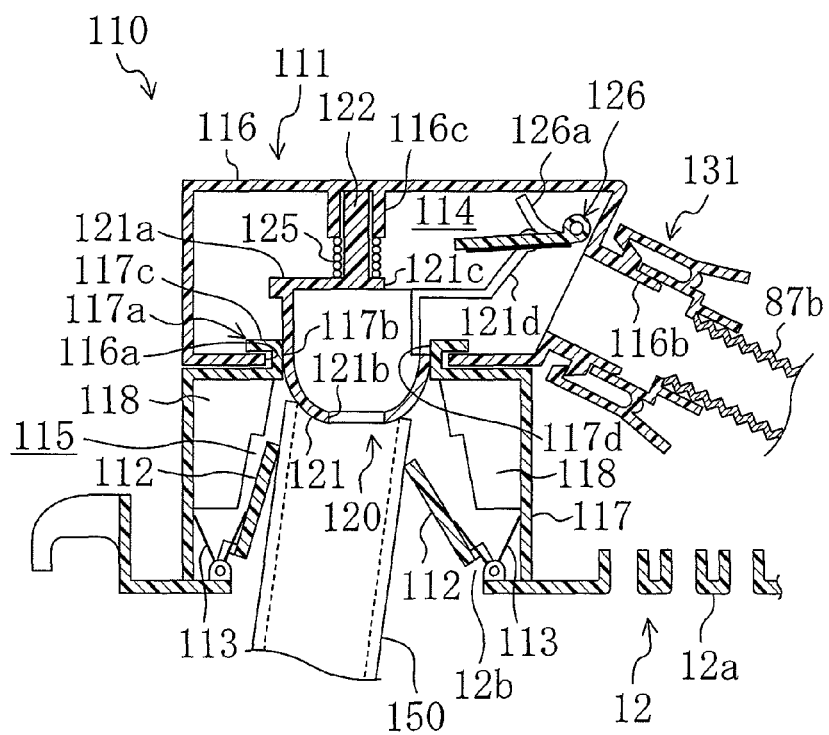

FIG. 18
(A)
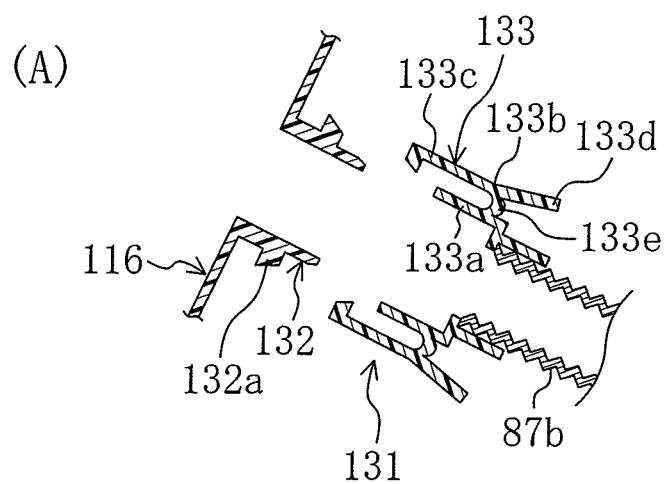
(B)
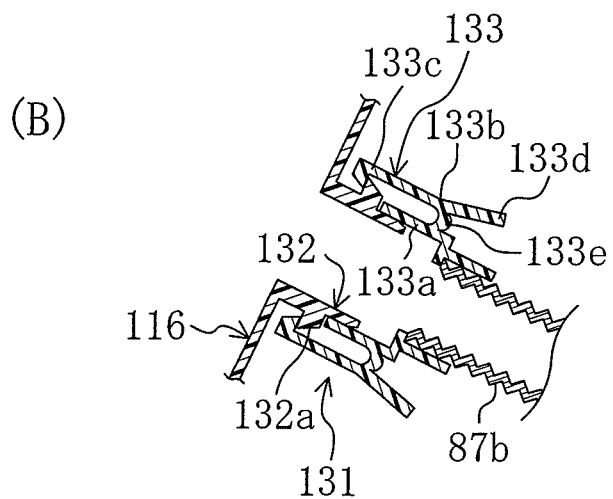

CLEANING UNIT OF AIR CONDITIONER

TECHNICAL FIELD

The present invention relates to cleaning units configured to remove dust captured by an air filter of an air conditioner.

BACKGROUND ART

Air conditioners which have an air filter at an air inlet and which have a dust removal device for removing dust captured by the air filter have been known. The air conditioners of this type is configured to suction dust adhering to the air filter by using a suction nozzle as the dust removal device, or configured to scrape the dust off by using a brush as the dust removal device, as shown in Patent Documents 1 and 2, for example.

Both of these structures include structural components, such as a heat exchanger and an indoor fan, disposed in a box-like casing, and include an air filter, a dust removal device, etc. at an inlet of the indoor fan. Further, the room side of the casing is covered with an indoor panel.

CITATION LIST

Patent Document

Patent Document 1: Japanese Patent Publication No. 2005-83612
Patent Document 2: Japanese Patent Publication No. 2007-40689

SUMMARY OF THE INVENTION

Technical Problem

However, according to the structure like the above-described conventional structures in which not only a heat exchanger and an indoor fan, but also an air filter and a dust removal device are disposed, the dust removal device for the air filter cannot be easily attached to the indoor unit of an existing air conditioner, or the dust removal device cannot be easily excluded to obtain a general indoor unit in response to the user's request. Thus, a problem arises in terms of the versatility of the indoor unit.

The present invention was made in view of the above problem, and it is an objective of the invention to provide a cleaning unit which allows a cleaning mechanism, such as a dust removal device, for an air filter to be easily mounted in an indoor unit of an air conditioner that has an air filter on the intake side of an indoor fan.

Solution to the Problem

To achieve the above objective, a cleaning unit (100) of an air conditioner (1) according to the present invention is constituted by a chamber casing (101) connected to a room side of an indoor main unit (10) having an indoor heat exchanger (22) and an indoor fan (21), an air filter (30) provided in the chamber casing (101), and a dust removal device (50). Therefore, the cleaning unit (100) can be easily mounted and detached.

Specifically, according to the first aspect of the present invention, the cleaning unit includes: a chamber casing (101) connected to a room side of an indoor main unit (10) having an indoor heat exchanger (22) and an indoor fan (21) which draws air from a room and blows the air to the indoor heat exchanger (22); an air filter (30) provided in the chamber casing (101) on an intake side of the indoor fan (21); and a dust removal device (50) configured to remove dust captured by the air filter (30).

With his structure, it is possible to easily attach and detach the cleaning unit (100) having the dust removal device (50) configured to remove dust captured by the air filter (30), to and from the indoor main unit (10) which is a conventional indoor unit. That is, the provision of the air filter (30) and the dust removal device (50) in the chamber casing (101), which is connected to the room side of the indoor main unit (10), enables the unitized cleaning unit (100) to be easily attached to an existing indoor unit. Thus, a cleaning mechanism can be added to the indoor unit more easily, compared to the case of conventional structures in which not only an indoor heat exchanger and an indoor fan, but also a dust removal mechanism is disposed in one casing. As a result, the versatility of the indoor unit can be increased.

In the above structure, the chamber casing (101) includes a dust collecting device (90) located in an area outside the air filter (30) in plan view, for collecting the dust removed by the dust removal device (50) (the second aspect of the present invention).

The provision of the dust collecting device (90), in the cleaning unit (100), for collecting the dust removed from the air filter (30) by the dust removal device (50) allows the dust removed from the air filter (30) to be stored for a certain period of time without collecting the dust every time the dust is removed. Therefore, the frequency of the user's work collecting the dust can be reduced. In addition, the above structure eliminates the need to install the dust collecting device (90) separately. Therefore, installation work can be reduced, compared to the case where the dust collecting device (90) is provided outside the cleaning unit (100). Moreover, it is possible to achieve a compact structure as a whole, compared to the structure where the dust collecting device (90) is provided outside the cleaning unit (100).

Further, the dust collecting device (90) is located in an area outside the air filter (30) in plan view. Therefore, flow of the air taken by the indoor fan (21) through the air filter (30) can be reliably prevented from being obstructed by the dust collecting device (90).

Further, it is preferable that the cleaning unit further includes a dust transfer device (80) configured to transfer the dust removed by the dust removal device (50) to the dust collecting device (90). (the third aspect of the present invention).

With this structure, the dust removed by the dust removal device (50) can be reliably transferred to the dust collecting device (90), and therefore, the dust can be efficiently collected in the dust collecting device (90).

In particular, it is preferable that the dust transfer device (80) transfers the dust to the dust collecting device (90) by utilizing the air blown by the indoor fan (21) (the fourth aspect of the present invention).

Utilizing the air blown by the indoor fan (21) for transfer of the dust enables the dust to be more reliably transferred into the dust collecting device (90), and can increase the dust collection efficiency. Moreover, since the indoor fan (21) is used to transfer the dust as described above, it is not necessary to provide a mechanism (e.g., a fan) dedicated to the dust transfer. Therefore, costs can be reduced, and it is possible to achieve the indoor unit (3) of a compact structure.

Further, it is preferable that the dust collecting device (90) is provided with a receiving opening (94) into which the air blown by the indoor fan (21) flows together with the dust, and a discharge opening (91) for discharging the blown air to the outside, and a filter (92) is disposed on an upstream side of the discharge opening (91) (the fifth aspect of the present invention).

This structure causes an air flow which flows into the dust collecting device (90) from the receiving opening (94) and flows out from the discharge opening (91), in the case where the dust is transferred by utilizing flow of the air. This means that air can smoothly flow in the dust collecting device (90). As a result, dust can be efficiently transferred into the dust collecting device (90) due to the air flow, and can be efficiently collected in the dust collecting device (90).

Moreover, as described above, the filter (92) on the upstream side of the discharge opening (91) of the dust collecting device (90) can reliably prevent the dust from being discharged to the outside through the discharge opening (91) together with the air. As a result, the dust collection efficiency of the dust collecting device (90) can be further increased.

Further, it is preferable that the dust collecting device (90) has a box-like shape, and the discharge opening (91) is formed in one side portion of the dust collecting device (90), and the receiving opening (94) is formed in the other side portion of the dust collecting device (90) (the sixth aspect of the present invention).

This structure allows the air to flow in the box-like dust collecting device (90) from one side to the other side, and therefore, it is possible to reduce air flow resistance in the dust collecting device (90). As a result, the dust can be more efficiently transferred into the dust collecting device (90) by utilizing the air flow.

Further, in the above structure, the dust removal device (50) may include a dust removal section (51, 52, 61) for removing the dust captured by the air filter (30), and a storage section (62) for collecting the dust removed by the dust removal section (51, 52, 61) (the seventh aspect of the present invention).

According to this structure, the dust removed from the air filter (30) by the dust removal section (51, 52, 61) is temporarily stored in the storage section (62). Thus, the dust can be prevented from diffusing into the surrounding space, and at the same time, the removed dust can be efficiently transferred into the dust collecting device (90).

Further, it is preferable that the dust removal device (50) is configured to be capable of moving between a dust removal position at which the dust removal device (50) overlaps with the air filter (30) in plan view, and a maintenance position at which the dust removal device (50) does not overlap with the air filter (30) in plan view (the eighth aspect of the present invention).

According to this structure, the dust removal device (50) is moved to a maintenance position which does not overlap with the air filter (30) during maintenance, for example. Thus, it is possible to detach the air filter (30) without detaching the dust removal device (50). As a result, it is possible to improve the efficiency of maintenance.

Specifically, in the case where the air filter (30) has a circular shape in plan view, it is preferable that the dust removal device (50) is arranged to extend in a radial direction of the air filter (30), and is rotatable about one end of the dust removal device (50) that is located radially outside the air filter (30) (the ninth aspect of the present invention).

With this structure, the dust removal device (50) can be rotated along the circular air filter (30), and therefore, the dust removal device (50) can be switched between the dust removal position and the maintenance position, as described in the eighth aspect of the present invention. That is, the dust removal device (50) is rotatable about its one end located radially outside the air filter (30). Thus, as described above, the dust removal device (50) can be easily switched between the dust removal position and the maintenance position by rotating the dust removal device (50).

Further, it is preferable that the cleaning unit further includes an electrical component box (105) in which an electrical component for controlling a component part (21, 40, 50, 70, 80) is accommodated, wherein the electrical component box (105) is electrically connected to an electrical component box (20) of the indoor main unit (10) such that transmission of an electric signal is possible between the electrical component box (105) and the electrical component box (20) (the tenth aspect of the present invention).

As described above, the electrical component box (105) of the cleaning unit (100) is provided separate from an electrical component box of the indoor main unit (10). Thus, the cleaning unit (100) can be an independent unit. In other words, the electrical component box (105) dedicated to the cleaning unit (100) is provided to the cleaning unit (100) as well, which makes it possible, for example, to add the cleaning unit (100) to an existing indoor unit. As a result, the versatility of the cleaning unit (100) can be increased. In addition, the electrical component box (105) of the cleaning unit (100) is connected to the electrical component box (20) of the indoor main unit (10) such that transmission of an electric signal is possible, and therefore, operations of the units (10, 100) can be linked.

Further, it is preferable that an engagement portion (146) to be engaged with a protrusion portion (145) provided on a bottom side of a casing (18) of the indoor main unit (10), is provided on a partition plate (25) which covers a top side of the chamber casing (101), and the partition plate (25) is provided with a transparent portion (147) which allows a visual check of the engagement portion between the protrusion portion (145) and the engagement portion (146) from under the partition plate (25) (the eleventh aspect of the present invention).

With this structure, the indoor main unit (10) and the cleaning unit (100) can be easily attached to each other by the protrusion portion (145) provided below the indoor main unit (10) and the engagement portion (146) provided on the partition plate (25) of the cleaning unit (100). In addition, when the protrusion portion (145) and the engagement portion (146) are engaged with each other, the engagement portion cannot be checked from below because of the partition plate (25) covering the top side of the cleaning unit (100). However, as described above, the transparent portion (147) which is provided on the partition plate (25) and which allows a visual check of the engagement portion, enables a user to check the engagement portion during attachment. Thus, the provision of the transparent portion (147) can improve the efficiency in attaching the cleaning unit (100).

Further, it is preferable that the chamber casing (101) includes dust collecting device (90) in an area outside the circular air filter (30) in plan view, for collecting the dust removed by the dust removal device (50); the dust removal device (50) is arranged to extend in a radial direction of the air filter (30), and is rotatable about one end of the dust removal device (50) that is located radially outside the air filter (30); the dust collecting device (90) is disposed below a partition plate (25) covering a top side of the chamber casing (101), in the area outside the air filter (30) in plan view and outside an area where the dust removal device (50) rotates; and the partition plate (25) located above the dust collecting device (90) is provided with an opening (25a) to be covered with a cover member (106) (the twelfth aspect of the present invention).

With this structure, maintenance of the air filter (30) and the component box (20) in the indoor main unit (10) can be performed without detaching the cleaning unit (100) located below the indoor main unit (10). That is, the dust removal device (50) is rotated to move to a position at which the dust removal device (50) does not overlap with the air filter (30) in plan view, thereby making it possible to detach the air filter (30) and allowing access to the indoor main unit (10) through the opening (25a) by detaching the dust collecting device (90). As a result, with the above structure, the efficiency in performing maintenance can be improved.

Further, the cleaning unit may further include dust collecting device (90) for collecting the dust removed by the dust removal device (50), wherein the dust collecting device (90) is connected to the dust removal device (50) through a duct (88) which constitutes a transfer path, and the duct (88) is detachably connected to at least one of the dust collecting device (90) and the dust removal device (50) (the thirteenth aspect of the present invention).

As described, the duct (88) serving as a transfer path connecting between the dust removal device (50) and the dust collecting device (90) is detachably connected to at least one of the dust removal device (50) and the dust collecting device (90). Thus, the duct (88) can be easily attached and detached when the dust collecting device (90) is detached, for example, at the time of maintenance. This can improve the efficiency in performing maintenance.

Advantages of the Invention

As described above, according to the present invention, the cleaning unit (100) is constituted by the chamber casing (101) connected to the room side of the indoor main unit (10), the air filter (30) provided in the chamber casing (101) on the intake side of the indoor fan (21), and dust removal device (50) for removing dust captured by the air filter (30). Therefore, a cleaning mechanism for the air filter (30) can be easily added to a general indoor unit, and as a result, the versatility of the indoor unit can be increased.

Further, according to the second aspect of the present invention, the cleaning unit (100) is provided with the dust collecting device (90) for collecting dust. Thus, the frequency of work collecting the dust removed by the dust removal device (50) can be reduced, thereby making it possible to reduce maintenance work. Moreover, the dust collecting device (90) is located in an area outside the air filter (30). Therefore, the air flowing into the air filter (30) can be reliably prevented from being obstructed by the dust collecting device (90).

Further, according to the third aspect of the present invention, the cleaning unit includes the dust transfer device (80) for transferring the dust removed by the dust removal device (50) to the dust collecting device (90). Thus, the dust can be efficiently collected in the dust collecting device (90). In particular, according to the fourth aspect of the present invention, the dust transfer device (80) transfers the dust to the dust collecting device (90) by utilizing the air blown by the indoor fan (21). Thus, the dust can be transferred to the dust collecting device (90) more reliably, and can be collected in the dust collecting device (90) more efficiently. Moreover, according to the fifth aspect of the present invention, the dust collecting device (90) is provided with the receiving opening (94) and the discharge opening (91), and the filter (92) is disposed on the upstream side of the discharge opening (91). Thus, the air can smoothly flow in the dust collecting device (90), and the filter (92) can prevent the dust from flowing out together with the air. As a result, the dust can be efficiently collected in the dust collecting device (90). Further, according to the sixth aspect of the present invention, the receiving opening (94) is formed in one side of the box-like dust collecting device (90), whereas the discharge opening (91) is formed in the other side of the dust collecting device (90). With this structure, the air can flow in the dust collecting device (90) more efficiently, and the dust can be collected in the dust collecting device (90) more efficiently.

Further, according to the seventh aspect of the present invention, the dust removal device (50) includes the dust removal section (51, 52, 61) for removing dust on the air filter (30), and the storage section (62) for collecting the removed dust. Thus, the dust removed by the dust removal section (51, 52, 61) can be collected in the storage section (62), and as a result, can be efficiently transferred into the dust collecting device (90).

Further, according to the eighth aspect of the present invention, the dust removal device (50) is configured to be capable of moving between the dust removal position at which the dust removal device (50) overlaps with the air filter in plan view, and the maintenance position at which the dust removal device (50) does not overlap with the air filter. Thus, it is not necessary to remove the dust removal device (50) in order to detach the air filter (30) or perform maintenance. As a result, the efficiency in performing maintenance can be improved. In particular, according to the ninth aspect of the present invention, in the case where the air filter (30) has a circular shape in plan view, the dust removal device (50) is arranged to extend in a radial direction of the air filter (30), and is rotatable about one end of the dust removal device (50) that is located radially outside the air filter (30). Thus, the dust removal device (50) can be easily switched between the dust removal position and the maintenance position, relative to the air filter (30). As a result, the efficiency in performing maintenance can be reliably improved.

Further, according to the tenth aspect of the present invention, the cleaning unit has an electrical component box (105) for the cleaning unit (100). The electrical component box (105) is connected to the electrical component box (20) of the indoor main unit (10) such that transmission of an electric signal is possible, and therefore, the cleaning unit (100) can be easily attached, as an independent unit, to an indoor unit or the like which has been installed. Moreover, even if the electrical component boxes (20, 105) are provided separately for respective units as described above, operations of the electrical component boxes (20, 105) can be linked to each other by connecting the electrical component boxes (20, 105) so as to be capable of signal transmission.

Further, according to the eleventh aspect of the present invention, the engagement portion (146) to be engaged with the protrusion portion (145) provided on a bottom side of the casing of the indoor main unit (10), is provided on the partition plate (25) of the cleaning unit (100). Therefore, the indoor main unit (10) and the cleaning unit (100) can be easily attached to each other. In addition, the partition plate (25) is provided with the transparent portion (147) which allows a visual check of the engagement portion between the protrusion portion (145) and the engagement from portion (146) from below. Therefore, it is possible for the user to visually check, during attachment, the engagement portion between the protrusion portion (145) and the engagement portion (146) through the transparent portion (147). As a result, working efficiency can be improved.

Further, according to the twelfth aspect of the present invention, the dust removal device (50) is arranged to extend in a radial direction of the circular air filter (30), and is rotatable about one end of the dust removal device (50) that is located radially outside the air filter (30). The opening (25a) which passes through the partition plate (25) is formed above the dust collecting device (90) located in the area outside the air filter (30) and outside an area where the dust removal device (50) rotates. Therefore, maintenance of the air filter (30) and the electrical component box (20) of the indoor main unit (10) can be performed without detaching the dust removal device (50) and the cleaning unit (100). As a result, the efficiency in performing maintenance can be improved.

Further, according to the thirteenth aspect of the present invention, the duct (88) which constitutes a transfer path between the dust collecting device (90) and the dust removal device (50) is detachably connected to at least one of the dust collecting device (90) and the dust removal device (50). Therefore, the dust collecting device (90) can be easily detached from the cleaning unit (100) at the time of maintenance, and as a result, the efficiency in performing maintenance can be improved.

BRIEF DESCRIPTION OF THE DRAWINGS

FIG. 16 is a vertical cross section for illustrating a structure of a nozzle insertion portion.

FIG. 18 is an enlarged cross section of a connecting portion between a nozzle insertion portion and a flexible duct.

DESCRIPTION OF REFERENCE CHARACTERS

1 Air Conditioner
3 Indoor Unit
10 Main Unit
11 Decorative Panel (Indoor Panel)
12 Inlet Grill
18 Main Casing (Casing)
20 Electrical Component Box
21 Indoor Fan (Component Part)
22 Indoor Heat Exchanger
23 Drain Pan (Main Partition Plate)
24 Bell Mouth (Main Partition Plate)
25 Partition Plate (Chamber Partition Plate)
25a Service Hole (Opening)
30 Air Filter
40 Filter Drive Device (Component Part)
50 Dust Removal Device (Component Part)
51 Rotating Brush (Dust Removal Section)
52 Cleaning Brush (Dust Removal Section)
60 Dust Storage Container
61 Removal Section (Dust Removal Section)
62 Storage Section
70 Storage Amount Detection Device (Component Part)
80 Dust Transfer Device (Component Part)
86 Introduction Duct
86d Introduction Opening
88 Transfer Duct (Duct)
90 Dust Collecting Box (Dust Collecting Device)
91 Discharge Opening
92 Filter
94 Receiving Opening
100 Cleaning Unit
101 Chamber Casing
105 Electrical Component Box
110 Nozzle Insertion Portion
106 Service Cover (Cover Member)
145 Hook (Protrusion Portion)
146 Fitting for temporary hanging (Engagement Portion)
147 Transparent Portion

DESCRIPTION OF EMBODIMENTS

Embodiments of the present invention will be described in detail hereinafter with reference to the drawings. The following embodiments are merely preferred examples in nature, and are not intended to limit the scope, applications, and use of the invention.

The present embodiment relates to an air conditioner (1) having a cleaning unit (100) according to the present invention. According to this air conditioner (1), the indoor unit (3) is mounted in the ceiling of a room. In the following description, a structure of the air conditioner (1) according to the present embodiment will be described first, and then, structures of the indoor unit (3) and the cleaning unit (100) will be described.

<General Structure>

Figure 1:
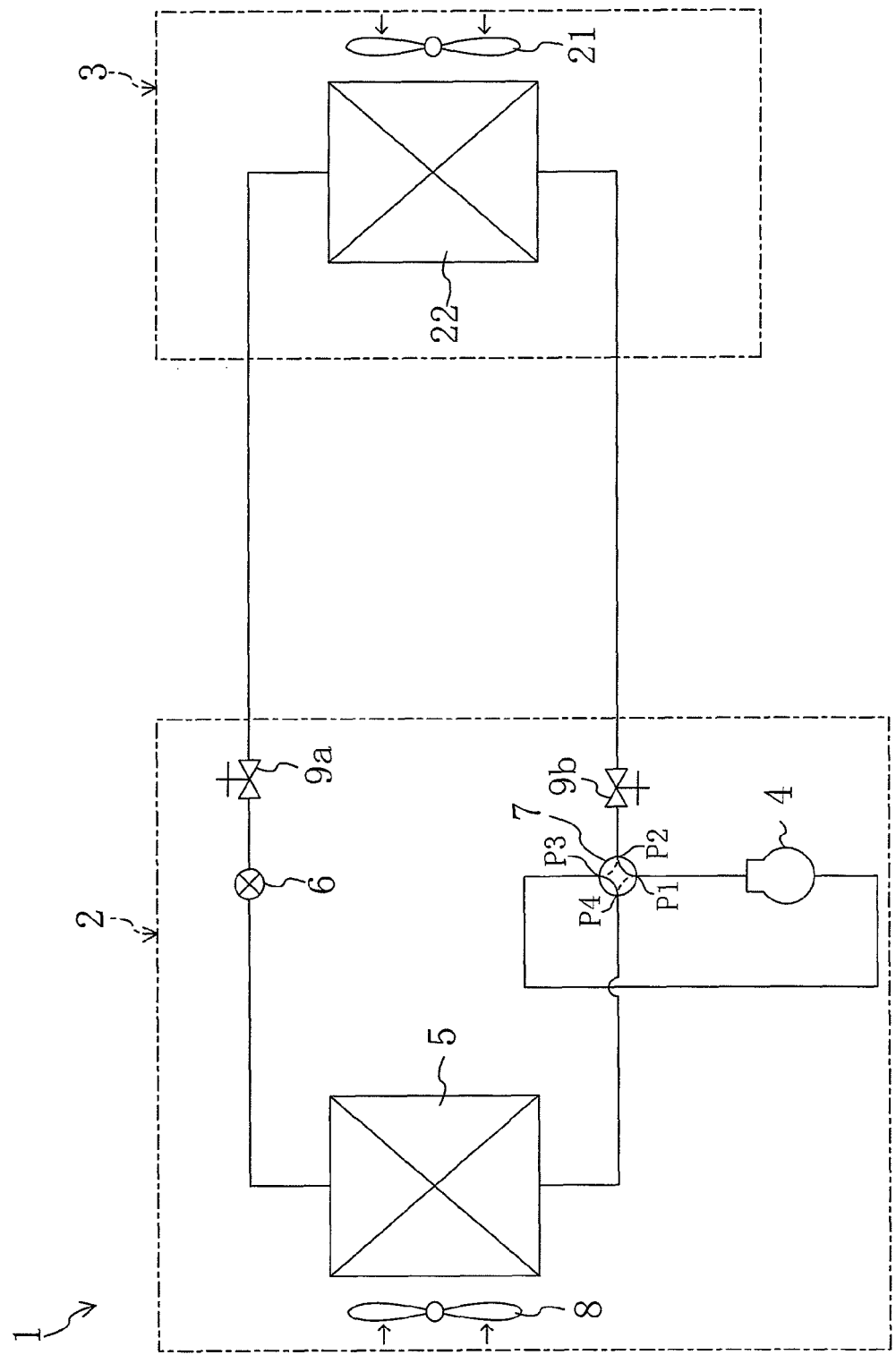
FIG. 1 shows a pipeline for illustrating a structure of an air conditioner having an indoor unit according to the present invention.

As shown in FIG. 1, the air conditioner (1) includes an outdoor unit (2) and an indoor unit (3). A compressor (4), an outdoor heat exchanger (5), an expansion valve (6), a four-way switching valve (7), and an outdoor fan (8) are provided in the outdoor unit (2). An indoor heat exchanger (22) and an indoor fan (21) are provided in the indoor unit (3).

In the outdoor unit (2), the discharge side of the compressor (4) is connected to a first port (P1) of the four-way switching valve (7). The intake side of the compressor (4) is connected to a third port (P3) of the four-way switching valve (7).

The outdoor heat exchanger (5) is a fin-and-tube heat exchanger of cross-fin type. One end of the outdoor heat exchanger (5) is connected to a fourth port (P4) of the four-way switching valve (7). The other end of the outdoor heat exchanger (5) is connected to a liquid side closing valve (9a).

The outdoor fan (8) is located close to the outdoor heat exchanger (5). The outdoor heat exchanger (5) exchanges heat between the outside air taken by the outdoor fan (8) and a refrigerant flowing in the heat exchanger (5). An expansion valve (6) whose degree of opening is variable is provided between the outdoor heat exchanger (5) and the liquid side closing valve (9a). Further, a second port (P2) of the four-way switching valve (7) is connected to a gas side closing valve (9b).

The four-way switching valve (7) is capable of switching between a first state (the state as shown in solid line in FIG. 1) in which the first port (P1) and the second port (P2) communicate with each other and in which the third port (P3) and the fourth port (P4) communicate with each other, and a second state (the state as shown in broken line in FIG. 1) in which the first port (P1) and the fourth port (P4) communicate with each other and in which the second port (P2) and the third port (P3) communicate with each other.

The air conditioner (1) performs a heating operation when the four-way switching valve (7) is in the first state, and performs a cooling operation when the four-way switching valve (7) is in the second state. During the heating operation, a vapor compression refrigeration cycle in which the outdoor heat exchanger (5) serves as an evaporator and the indoor heat exchanger (22) serves as a condenser, is performed in the refrigerant circuit shown in FIG. 1. In contrast, during the cooling operation, a vapor compression refrigeration cycle in which the outdoor heat exchanger (5) serves as a condenser and the indoor heat exchanger (22) serves as an evaporator, is performed in the refrigerant circuit shown in FIG. 1.

<Structure of Indoor Unit>

A structure of the indoor unit (3) will be described in detail hereinafter, with reference to FIGS. 2-4.

Figure 2:
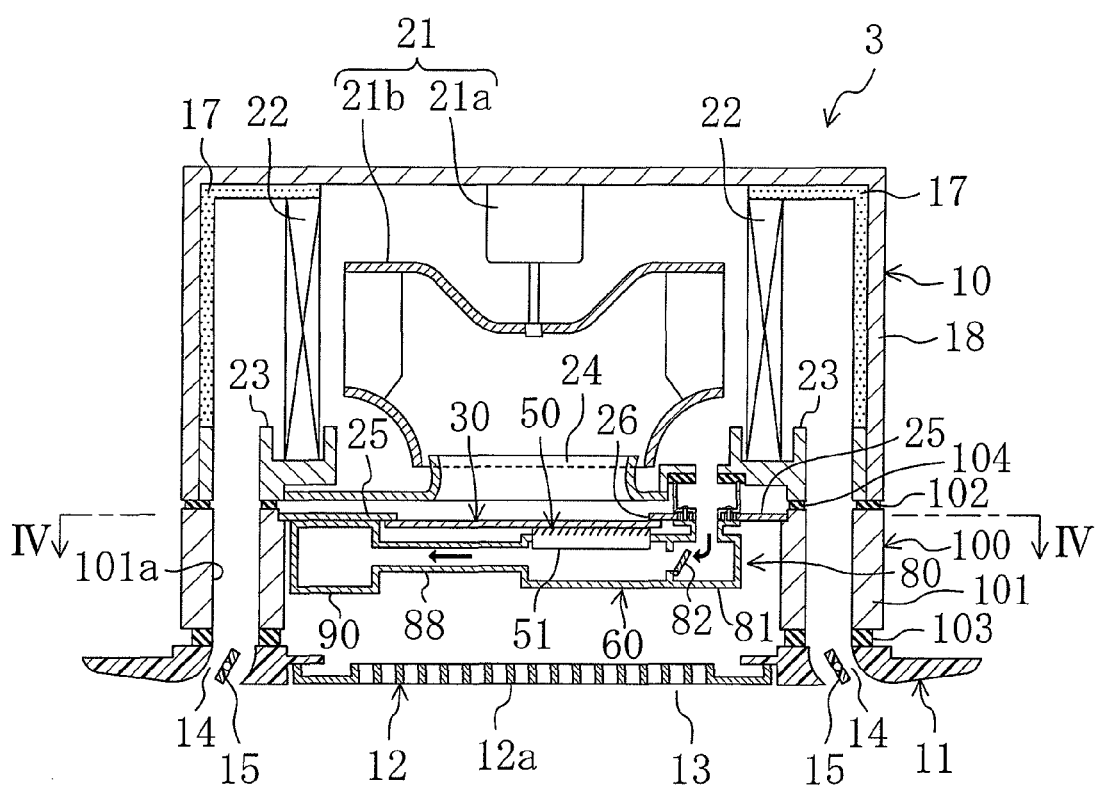
FIG. 2 is a vertical cross section for illustrating a structure inside the indoor unit.
Figure 3:
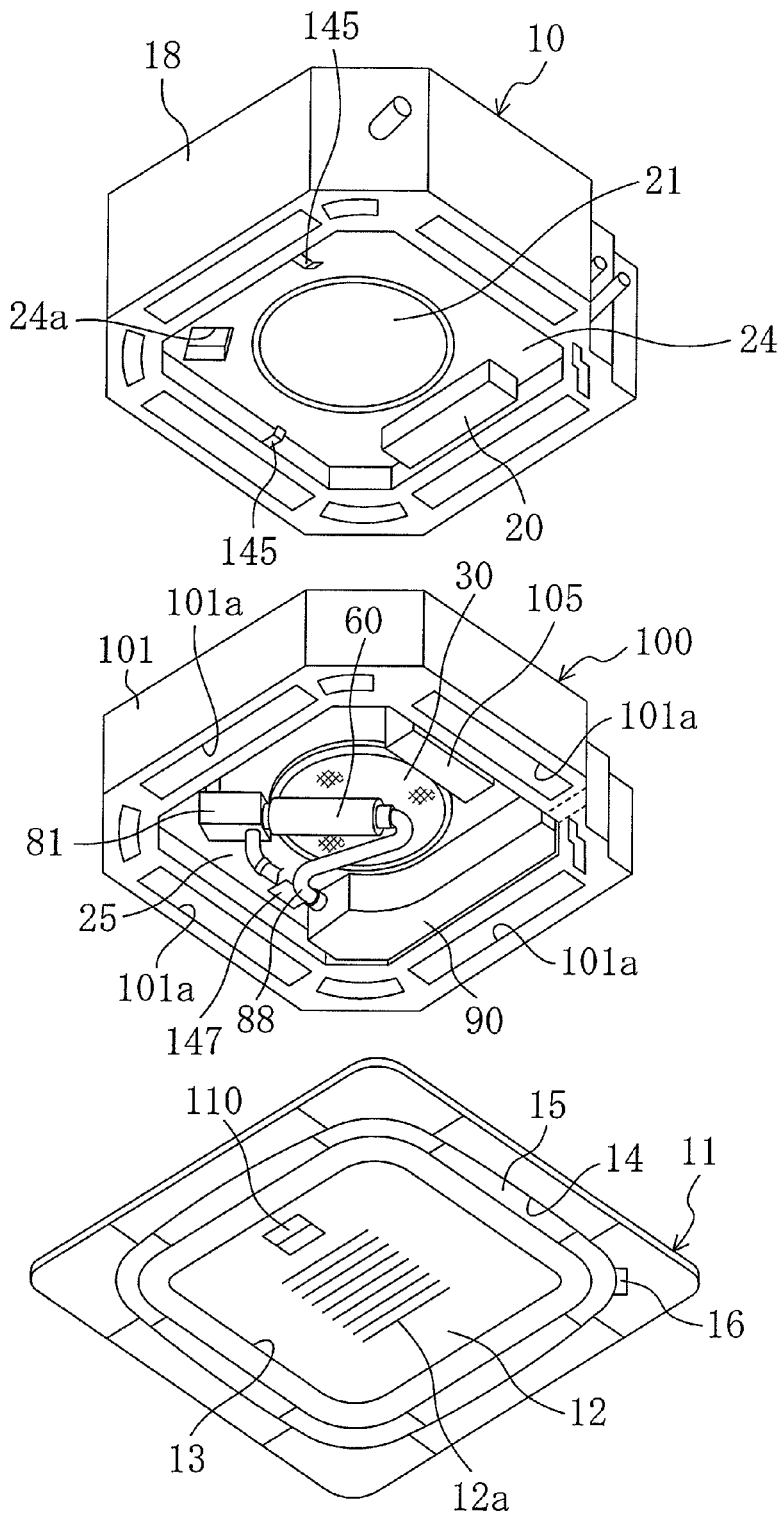
FIG. 3 is an exploded oblique view for illustrating each unit that constitutes the indoor unit.

As shown in FIGS. 2 and 3, the indoor unit (3) includes a main unit (10) (indoor main unit) having the indoor fan (21) and the indoor heat exchanger (22), a cleaning unit (100) placed on the room side of the main unit (10), and a decorative panel (11) which covers the room side of the cleaning unit (100). That is, the indoor unit (3) is constituted by the main unit (10), the cleaning unit (100) and the decorative panel (11) stacked in this order from the top as shown in FIG. 3.

The main unit (10) has a box-like main casing (18) which is open toward the room. The indoor fan (21), the indoor heat exchanger (22), a drain pan (23), a bell mouth (24), and an electrical component box (20) are disposed in the main casing (18). According to the present embodiment, part of the drain pan (23) and part of the bell mouth (24) constitute a main partition plate which covers a bottom side of the main casing (18) of the main unit (10).

A heat insulation (17) is attached to the inner surface of the main casing (18). The main casing (18) is supported on and suspended from the wall above the ceiling such that the opening of the main casing (18) is positioned on the room side, as described later.

The indoor fan (21) is a so-called "turbo fan." As shown in FIG. 2, the indoor fan (21) is located at a generally central location of the main casing (18) of the main unit (10), and positioned above an inlet (13) of the decorative panel (11) described later. The indoor fan (21) has a fan motor (21a) and an impeller (21b). The fan motor (21a) is fixed to the top plate of the main casing (18). The impeller (21b) is connected to the shaft of the fan motor (21a).

The bell mouth (24) is provided under the indoor fan (21) so as to communicate with the inlet (13). In the interior of the indoor unit (3), the bell mouth (24) partitions the space on the upstream side of the indoor heat exchanger (22) into a space on the indoor fan (21) side and a space on the inlet grill (12) side, as shown in FIG. 2. The provision of the bell mouth (24) allows the air drawn by the indoor fan (21) from a space under the bell mouth (24) to be blown out in a circumferential direction in a space above the bell mouth (24).

Further, the ventilation partition plate of the present embodiment that is constituted by the bell mouth (24) and the drain pan (23), is provided with an opening (24a) at a location corresponding to one of four corners of the rectangular parallelepiped main casing (18), as shown in FIG. 3. The opening (24a) constitutes an introduction opening of an introduction duct (86) described later. In the case where the indoor unit (3) does not include the cleaning unit (100) (but includes only the main unit (10)), the opening (24a) is closed by a cover (not shown) so that the air blown by the indoor fan (21) will not escape from the opening (24a).

The indoor heat exchanger (22) has a generally square shape in plan view, and is arranged in the main casing (18) so as to surround the indoor fan (21). The indoor heat exchanger (22) exchanges heat between the room air taken by the indoor fan (21) (blown air) and the refrigerant flowing in the heat exchanger (22).

The drain pan (23) is placed under the indoor heat exchanger (22). The drain pan (23) is for receiving drain water generated as a result of condensation of water vapor in the air at the indoor heat exchanger (22). The drain pan (23) is provided with a drain pump (not shown) for draining drain water. Further, the drain pan (23) is inclined so that the drain water is collected at a place where the drain pump is provided.

The electrical component box (20) accommodates various types of electrical components for controlling operations of component parts, such as the indoor fan (21) in the indoor unit (3). As shown in FIG. 3, the electrical component box (20) is positioned under the bell mouth (24) and is located in an area outside the inlet of the indoor fan (21) in plan view so as not to overlap with the inlet of the indoor fan (21). According to the present embodiment, the electrical component box (20) is placed at a location opposite to the opening (24a) formed in the bell mouth (24), with the inlet of the indoor fan (21) interposed between the opening (24a) and the electrical component box (20).

The cleaning unit (100) includes a generally rectangular chamber casing (101) in plan view, in which a circular air filter (30), a dust removal device (50), a dust transfer device (80), and a dust collecting box (90) (a dust collecting device), etc. are disposed. Specifically, the cleaning unit (100) is configured to be capable of removing dust which adheres to the air filter (30) located on the intake side of the indoor fan (21) by using the dust removal device (50), of transferring the removed dust into the dust collecting box (90) by using the dust transfer device (80), and of storing the dust in the dust collecting box (90), as will be described in detail later.

The chamber casing (101) is configured to have the same size as the size of the main casing (18) of the main unit (10), and is located on the room side of the main casing (18), with a sealing member (102) sandwiched between the main casing (18) and the chamber casing (101), as shown in FIG. 2.

Further, a decorative panel (11) is attached to the room side of the chamber casing (101), with a sealing member (103) sandwiched between the chamber casing (101) and the decorative panel (11).

Further, the chamber casing (101) is provided with four air paths (101*a*) along each side of the chamber casing (101). Each air path (101*a*) communicates with the space in the main casing (18) that is created in the outer peripheral region of the indoor heat exchanger (22) in the main unit (10), so that the air after heat exchange with the refrigerant by the indoor heat exchanger (22) can flow toward the room. That is, the air having flowed in the air paths (101*a*) formed in the chamber casing (101) is supplied to the room through the outlet (14) formed in the decorative panel (11). In the chamber casing (101), as shown in FIG. 2, the inner side portions of the air paths (101*a*) support, from below, the drain pan (23) of the main unit (10), with a sealing member (104) sandwiched therebetween.

The decorative panel (11) has a rectangular, plate-like shape in plan view (see FIG. 3). As shown in FIG. 2, the decorative panel (11) is slightly larger in size than the main casing (18) of the main unit (10) and the chamber casing (101) of the cleaning unit (100) in plan view. As described above, the decorative panel (11) is attached to the chamber casing (101) so as to cover the bottom side of the chamber casing (101), with the sealing member (103) sandwiched between the chamber casing (101) and the decorative panel (11). Thus, the decorative panel (11) is exposed to the room as shown in FIG. 3.

Further, the decorative panel (11) is provided with one inlet (13) and four outlets (14, 14, . . . ) as shown in FIG. 3. The inlet (13) has a generally rectangular shape, and is disposed in a central portion of the decorative panel (11). An inlet grill (12) having a slit portion (12*a*), described later, is fitted in the inlet (13). The outlets (14) have an elongated rectangular shape, and are provided along sides of the decorative panel (11) so as to correspond to the air paths (101*a*, 101*a*, . . . ) of the cleaning unit (100). Further, each outlet (14) is provided with a wind direction control plate (15) (see, e.g., FIG. 2). The wind direction control plate (15) is rotatable and therefore capable of adjusting the wind direction (blowout direction).

The inlet grill (12) is a cover member having, at its central portion, the slit portion (12*a*) with a plurality of slit openings, and is attached to the decorative panel (11) such that the inlet grill (12) covers the inlet (13) of the decorative panel (11). Further, as will be described in detail later, the inlet grill (12) is provided with a nozzle insertion portion (110) for inserting a nozzle (150) of a cleaner. The nozzle (150) of the cleaner can be inserted in the nozzle insertion portion (110) so that the dust stored in the dust collecting box (90) can be collected by the cleaner.

Further, the decorative panel (11) is provided with an LED (16) which lights, for example, when the amount of dust stored in the dust collecting box (90) of the cleaning unit (100) exceeds a predetermined amount, or when the dust removal device (50) is removing the dust adhering to the air filter (30), as described later.

<Structure of Cleaning Unit>

Now, an internal structure of the cleaning unit (100) will be described in detail hereinafter, with reference to drawings FIGS. 4-14.

As described above, the cleaning unit (100) includes the generally rectangular chamber casing (101), in which the air filter (30), the dust removal device (50), the dust transfer device (80), the dust collecting box (90), and the electrical component box (105), etc. are disposed. The cleaning unit (100) is for cleaning the air filter (30) located under the inlet of the indoor fan (21) of the main unit (10).

Also, the cleaning unit (100) is provided with the partition plate (25) (a chamber partition plate) covering the lower side of the bell mouth (24). The partition plate (25) partitions a space between the bell mouth (24) and the inlet grill (12) into upper and lower spaces as shown, for example, in FIG. 2. That is, the partition plate (25) separates the space on the upstream side of the indoor heat exchanger (22) into a space on the indoor heat exchanger (22) side, the space including the bell mouth (24), and a space on the inlet grill (12) side.

Figure 5:
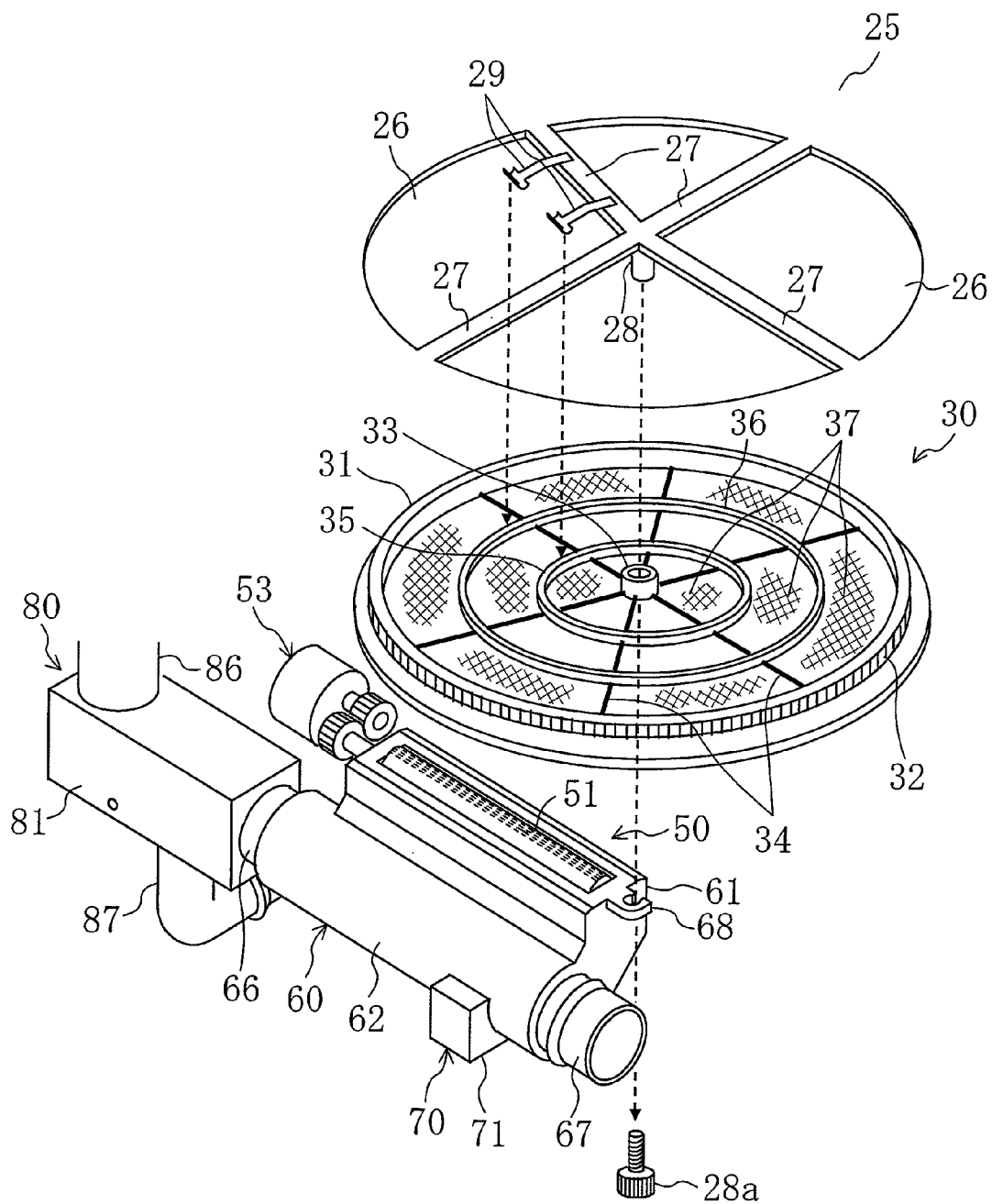
FIG. 5 is an oblique view for illustrating structures of an air vent in a partition plate, an air filter, and a dust storage container.

An air vent (26) for allowing air taken through the inlet (13) to flow into the bell mouth (24) is provided in the central portion of the partition plate (25), as shown in FIGS. 2 and 5. The air vent (26) is a circular hole, which is divided into sectors by four radial beam members (27) extending in a radial direction. The radial beam members (27) are connected to each other at the center of the circular air vent (26). The center of the air vent (26) is provided with a cylindrical, filter turning shaft (28) which protrudes downward from the center of the air vent (26). The filter turning shaft (28) is a rotating shaft for rotating the air filter (30). Further, one of the radial beam members (27) is provided with two filter pressing members (29) for pressing the air filter (30) against the rotating brush (51) of the dust removal device (50) from above.

As will be described in detail later, a service hole (25*a*) (opening) is provided at a side of the air vent (26) formed in the partition plate (25) such that the service hole (25*a*) is connected to the air vent (26). A service cover (106) (a cover member) is positioned to close the service hole (25*a*) (see FIGS. 22 and 23).

As shown in FIG. 5, the air filter (30) is located under the air vent (26) formed in the partition plate (25), and has a disk-like shape whose diameter is larger than the diameters of the bell mouth (24) and the air vent (26). Specifically, the air filter (30) includes a ring-shaped filter body (31) and a mesh member (37). The outer peripheral surface of the filter body (31) is provided with a gear (32). A center portion of the filter body (31) is provided with a cylindrical shaft insertion portion (33) supported by six radial ribs (34) which extend in a radial direction. In other words, each radial rib (34) extends radially from the shaft insertion portion (33) to be connected to the filter body (31). Further, the inner side of the filter body (31) is provided with a ring-shaped inner circumferential rib (35) and an outer circumferential rib (36) which are concentric with the filter body (31). The diameter of the outer circumferential rib (36) is larger than the diameter of the inner circumferential rib (35). Here, as shown in FIG. 6, the inner diameter of the shaft insertion portion (33) is larger than the diameter of the filter turning shaft (28) formed on the partition plate (25) and the diameter of the head of a fastening screw (28*a*) described later.

The mesh member (37) is stretched over the filter body (31). The air taken through the inlet (13) passes through the mesh member (37) of the air filter (30), and flows into the bell mouth (24). Here, the dust in the air is captured by the mesh member (37).

Further, the air filter (30) is biased downward by the above-described filter pressing members (29) which abut on each upper surface of the ring-shaped circumferential ribs (35, 36). Thus, the air filter (30) is pressed against a rotating brush (51), described later, of the dust removal device (50). With this structure, it is possible to improve the dust removal efficiency of the dust removal device (50).

Figure 6:
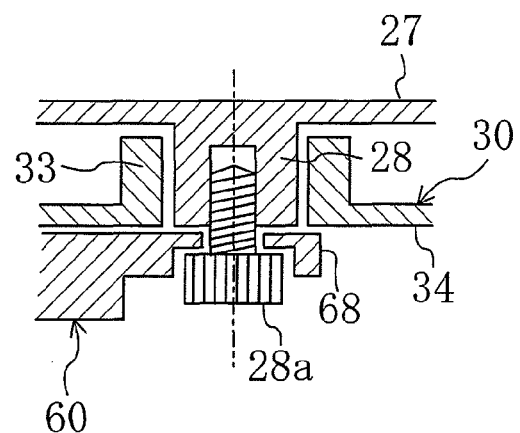
FIG. 6 is a cross section for illustrating an attachment structure of the air filter.

As shown in FIGS. 5 and 6, the shaft insertion portion (33) of the air filter (30) is rotatably fitted to the filter turning shaft (28) of the partition plate (25). A dust storage container (60)

of the dust removal device (50) is located under the air filter (30). The filter turning shaft (28) is inserted in the shaft insertion portion (33) of the air filter (30), and in this state, a filter attachment portion (68) of the dust storage container (60), described later, and the shaft insertion portion (33) of the partition plate (25) are fastened to each other with the fastening screw (28a). This structure allows the air filter (30) to be kept between the partition plate (25) and the dust storage container (60).

Figure 4:
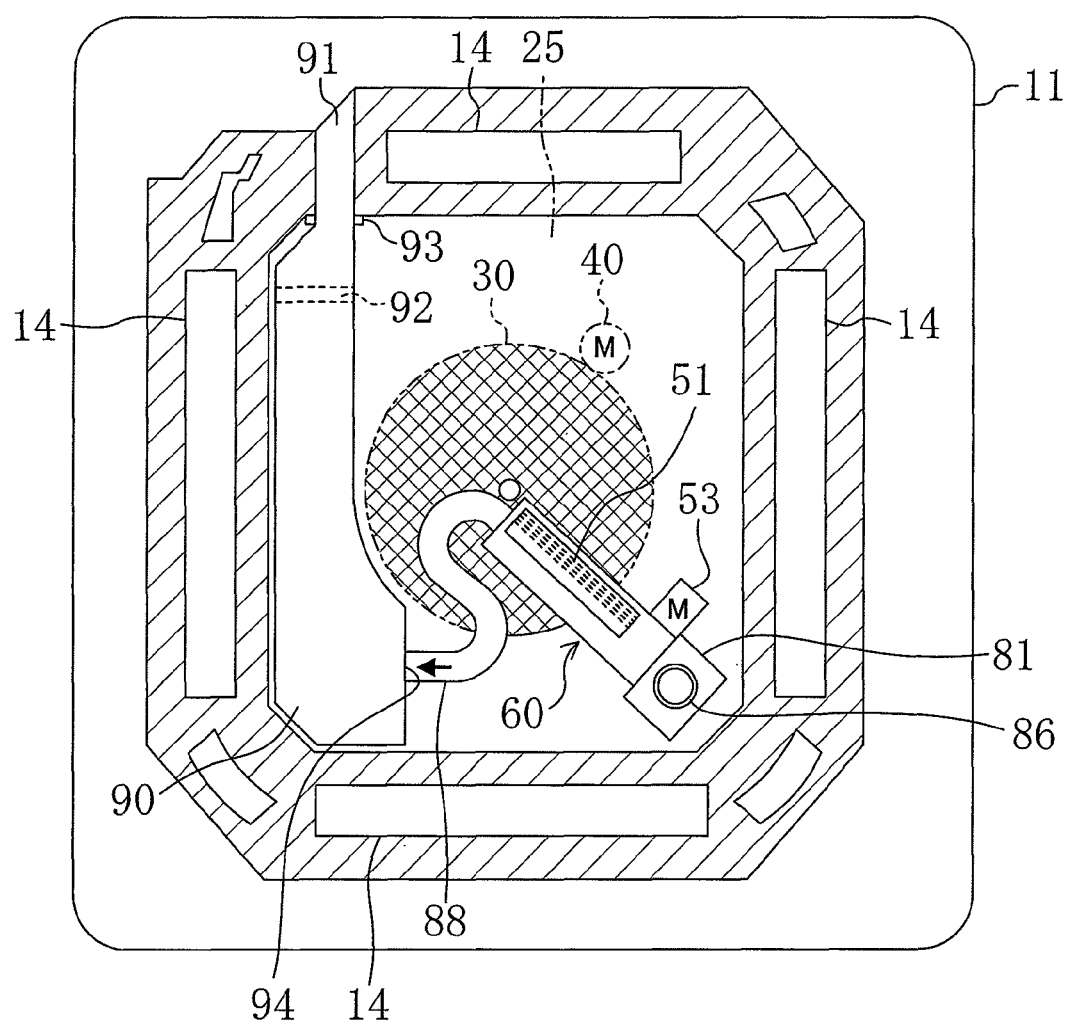
FIG. 4 is a cross section taken along the line IV-IV in FIG. 2.
Figure 7:
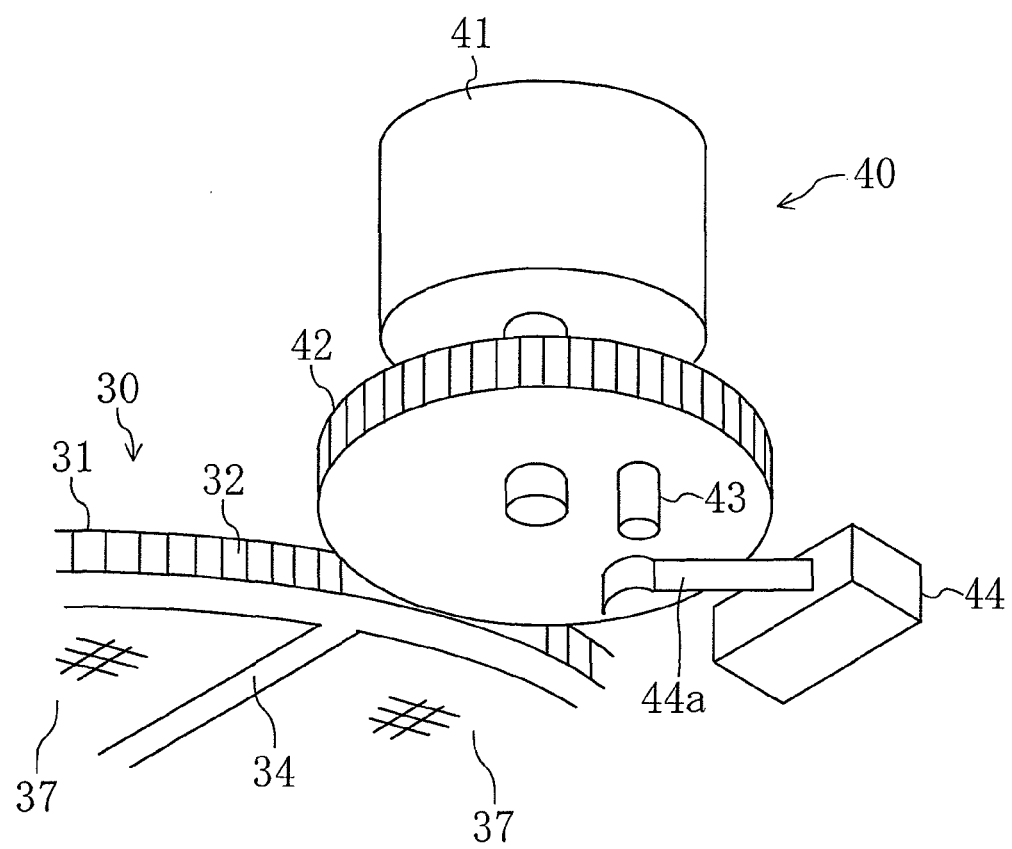
FIG. 7 is an oblique view for illustrating a structure of filter drive device.

As shown in FIGS. 4 and 7, a filter drive device (40) for rotating the air filter (30) is provided at a location close to the air filter (30). The filter drive device (40) includes a filter drive motor (41) and a limit switch (44) as shown in FIG. 7. The drive shaft of the filter drive motor (41) is provided with a drive gear (42), which engages with the gear (32) of the air filter (30). One end surface of the drive gear (42) (the lower surface in the drawing) is provided with a switch actuating portion (43) which is a protrusion. The switch actuating portion (43) abuts against a lever (44a) of the limit switch (44) by the rotation of the drive gear (42), and thereby moves the lever (44a). When the lever (44a) moves, the limit switch (44) detects the movement of the lever (44a). In other words, the switch actuating portion (43) and the limit switch (44) detect the rotation of the drive gear (42), and therefore, it is possible to detect timing of actuation of the dust removal device (50) according to the number of rotations of the drive gear (42), or detect a malfunction in the case where the drive gear (42) does not rotate.

Next, the dust removal device (50), the storage amount detection device (70), the dust transfer device (80), and the dust collecting box (90), which are provided in the cleaning unit (100), will be described with reference to FIGS. 8-14.

Figure 10:
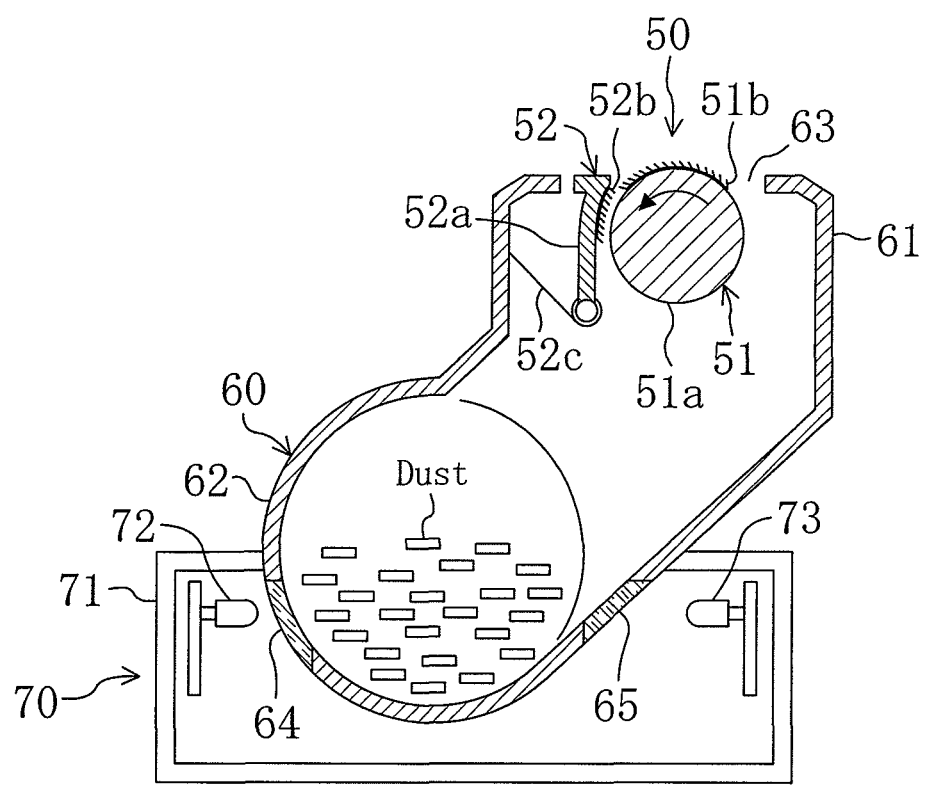
FIG. 10 is a cross section taken along the line X-X in FIG. 8.
Figure 11:
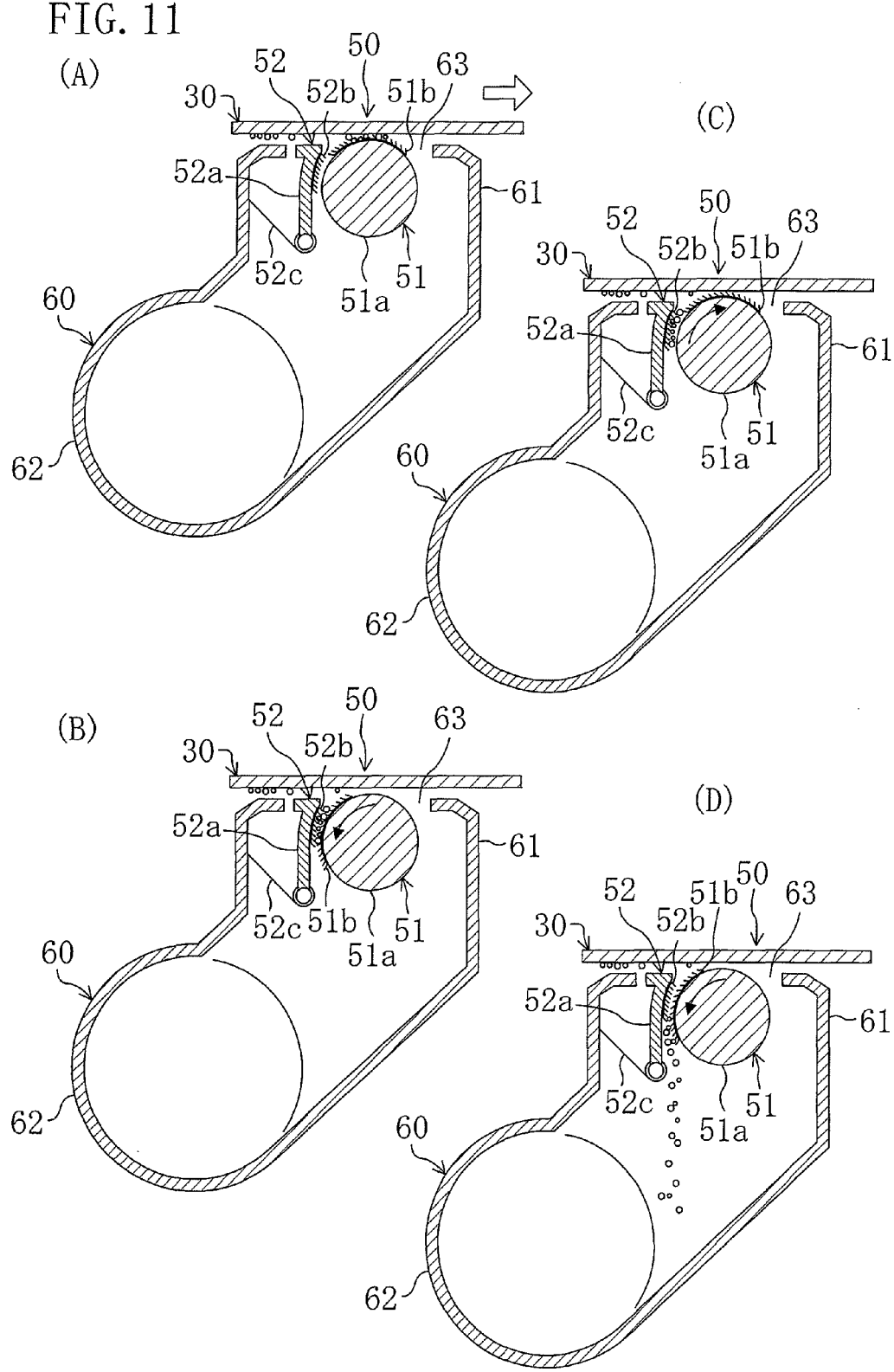
FIG. 11 shows cross sections taken along the line XI-XI in FIG. 8, for illustrating a movement of a rotating brush during a dust removal operation and a brush cleaning operation.

The dust removal device (50) is for removing dust captured by the air filter (30). The dust removal device (50) includes, as shown in FIGS. 10 and 11, a rotating brush (51) and a cleaning brush (52), which are brush members, a brush drive device (53), and a dust storage container (60) for storing the removed dust. As shown in FIG. 10, the rotating brush (51) and the cleaning brush (52) are provided in the brush opening (63) of the dust storage container (60).

The rotating brush (51) includes an elongated, cylindrical shaft (51a) and a brush (51b) located on the outer peripheral surface of the shaft (51a). The brush (51b) includes a plurality of piles. Further, the brush (51b) is provided on part of the outer surface of the shaft (51a) in a circumferential direction, along an axial direction of the shaft (51a).

The cleaning brush (52) is provided on a surface of the rotating brush (51) and can come into contact with the rotating brush (51). The cleaning brush (52) includes a main portion (52a), a brush (52b), and a spring (52c). The main portion (52a) is a plate-like member, and the length of the main portion (52a) is the same as that of the shaft (51a) of the rotating brush (51). The main portion (52a) is positioned at a predetermined distance from the outer peripheral surface of the rotating brush (51), and faces the rotating brush (51). The upper portion of the main portion (52a) has an arc shape so that the upper portion can be along the outer peripheral surface of the shaft (51a) of the rotating brush (51). The arc-shaped upper portion of the main portion (52a) is provided with the brush (52b) along a lengthwise direction of the main portion (52a). The spring (52c) is constituted by a plate spring. One end of the spring (52c) is connected to a lower end of the main portion (52a), and the other end of the spring (52c) is connected to an inner wall of the dust storage container (60). That is, the lower end of the main portion (52a) is supported by the spring (52c).

Each of the rotating brush (51) and the cleaning brush (52) has a length that is equal to or longer than the radius of the circular air filter (30), and radially extends outward from the center of the circular air filter (30). That is, as shown in FIG. 4, the dust removal device (50) is arranged so as to extend in a radial direction of the air filter (30).

Figure 8:
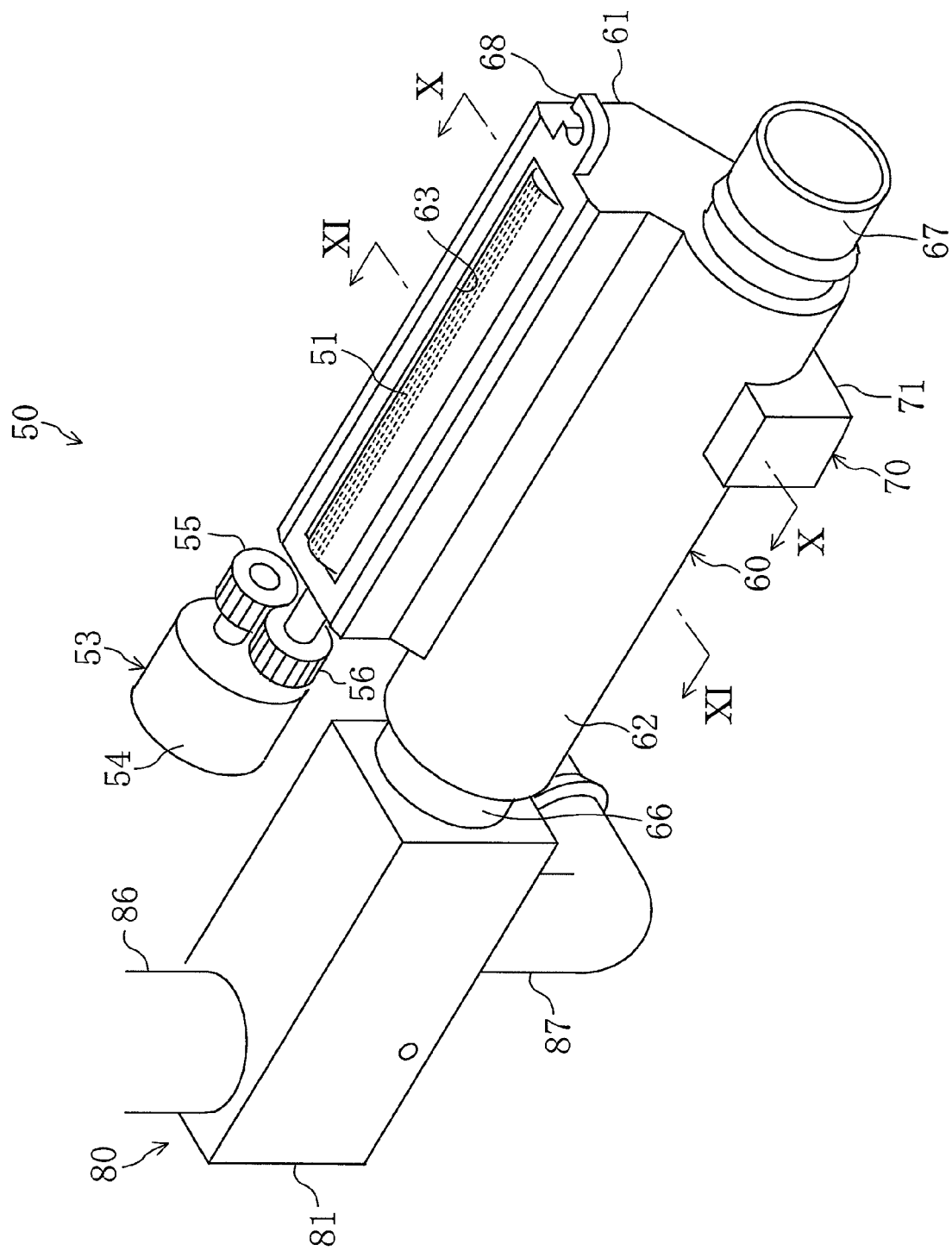
FIG. 8 shows dust removal device and a dust storage container viewed obliquely from above.
Figure 9:
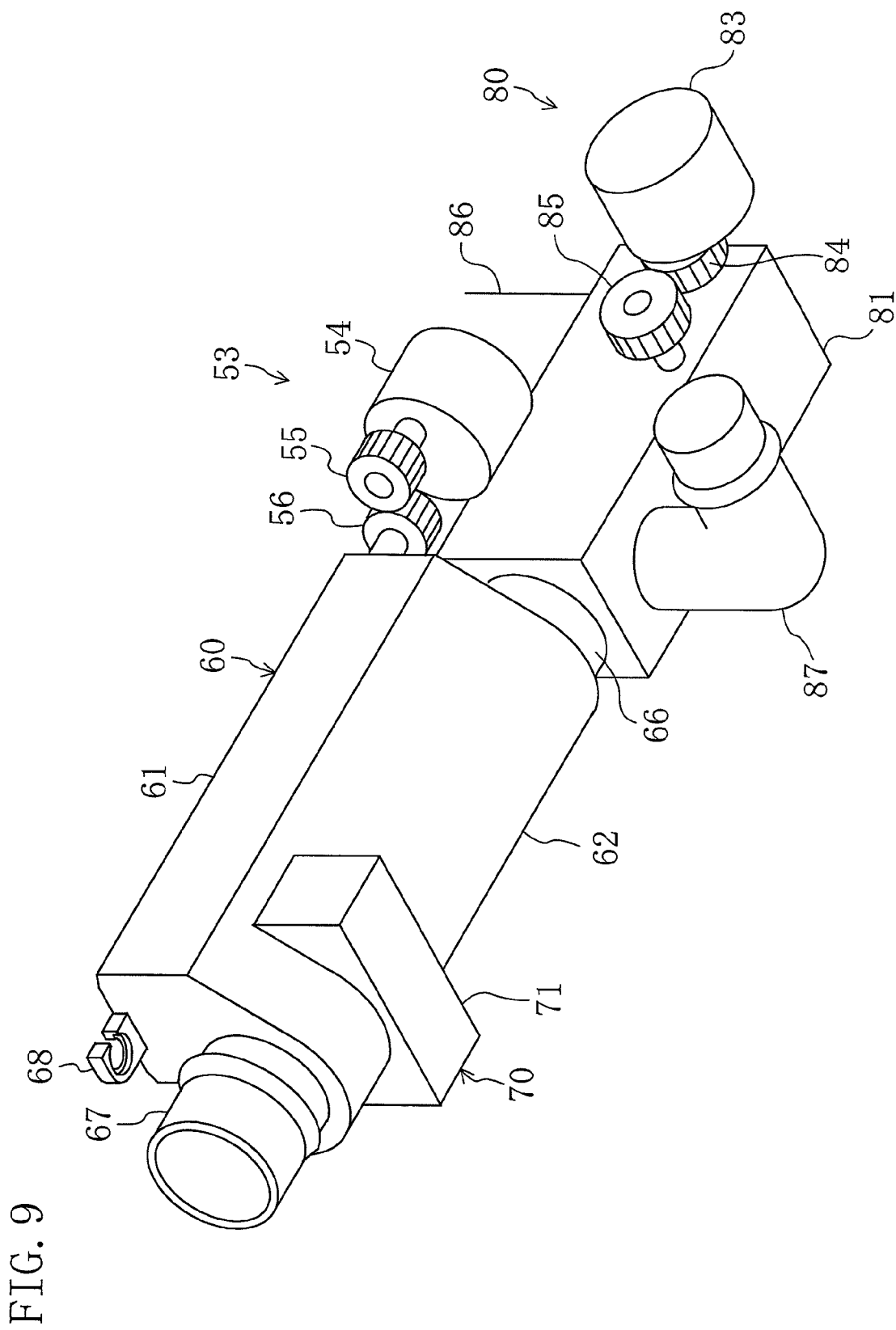
FIG. 9 shows a dust storage container viewed obliquely from below.

The brush (51b) of the rotating brush (51) comes into contact with the mesh member (37) of the rotating air filter (30), and thereby removes dust from the mesh member (37). Further, the rotating brush (51) is rotated by the brush drive device (53) in one direction and the opposite direction, as shown in FIGS. 10 and 11. The brush drive device (53) includes a brush drive motor (54), and a drive gear (55) and a driven gear (56) which are engaged with each other, as shown in FIGS. 8 and 9. The drive gear (55) is attached to a drive shaft of the brush drive motor (54). The driven gear (56) is attached to one end of the shaft (51a) of the rotating brush (51). This structure allows the rotation of the brush drive motor (54) to be transferred to the rotating brush (51) by way of the drive gear (55) and the driven gear (56), and thereby rotating the rotating brush (51).

According to the above structure, when the rotating brush (51) is rotated by the brush drive device (53), the brush (52b) of the cleaning brush (52) comes into contact with the brush (51b) of the rotating brush (51), and the cleaning brush (52) removes the dust from the brush (51b) of the rotating brush (51). In other words, the cleaning brush (52) is for removing dust from the rotating brush (51), and thereby cleaning the rotating brush (51), and the brush drive device (53) is for rotating the rotating brush (51) such that the dust captured by the brush (51b) of the rotating brush (51) is scraped off by the cleaning brush (52).

Further, both brushes (51b, 52b) of the rotating brush (51) and the cleaning brush (5) are made of pile fabric. The pile fabric is a plush material made on a base fabric in which yarn (pile yarn) is interwoven, and the length of the pile is relatively short. Further, the pile fabric is an inclined pile material in which pile is inclined in a certain direction.

Specifically, piles of the brush (51b) of the rotating brush (51) are inclined leftward from the shaft (51a) as shown in FIG. 10. That is, the piles of the brush (51b) are inclined in a direction opposite to the rotational direction of the air filter (30). Therefore, the rotation of the air filter (30) in the direction opposite to the direction along which the piles of the brush (51b) are inclined, enables the dust captured by the mesh member (37) to be scraped off efficiently.

Further, piles of the brush (52b) of the cleaning brush (52) are inclined obliquely downward from the main portion (52a) as shown in FIG. 10. That is, the piles of the brush (52b) are inclined in a direction opposite to the rotational direction of the rotating brush (51) when the rotating brush (51) rotates clockwise in FIG. 10. Therefore, the rotation of the rotating brush (51) in the direction opposite to the direction along which the piles of the brush (52b) of the cleaning brush (52) are inclined, enables the dust adhering to the brush (51b) of the rotating brush (51) to be removed with the brush (52b) of the cleaning brush (52).

The dust removal operation of the rotating brush (51) and the cleaning brush (52) will be described in detail later.

The dust storage container (60) is for collecting and temporarily storing dust removed from the rotating brush (51) by the cleaning brush (52). The dust storage container (60) is a columnar container whose upper portion protrudes rightward relative to the lower portion thereof in side view (when viewed from the right side of FIG. 8), which means that the dust storage container (60) is slightly bent at the middle to form an inclined V-shape in side view. The upper portion of the dust storage container (60) is a removal section (61) in which the rotating brush (51) for removing dust adhering to the air filter (30) and others are disposed. The lower portion of the dust storage container (60) is a storage section (62) for storing dust removed from the air filter (30) with the rotating brush (51). The dust removal section of the present invention corresponds to the structure in which the rotating brush (51) and the cleaning brush (52) are disposed in the removal section (61) of the dust storage container (60).

Specifically, the removal section (61) has, in its top surface, a brush opening (63) extending in a lengthwise direction of the removal section (61). As mentioned above, the cleaning brush (52) and the rotating brush (51) of the dust removal device (50) are located in the brush opening (63).

Further, one surface of the removal section (61) is provided with the above-mentioned filter attachment portion (68). The filter attachment portion (68) is a protrusion having a generally U-shape in plan view which is open toward the direction along which the removal section (61) protrudes from the storage section (62). Further, as shown in FIG. 6, the width dimension of the inner side of the U-shape of the filter attachment portion (68) is larger than the diameter of the screw portion of the fastening screw (28a) which is screwed into the filter turning shaft (28) of the partition plate (25), and is smaller than the diameter of the filter turning shaft (28).

According to this structure, as shown in FIG. 6, the fastening screw (28a) is screwed into the filter turning shaft (28), with the air filter (30) sandwiched between the filter attachment portion (68) and the radial beam members (27) of the partition plate (25). Therefore, the air filter (30) can be fixed between the filter attachment portion (68) and the partition plate (25). To detach the air filter (30), the fastening screw (28a) is loosened, and the dust storage container (60) having the filter attachment portion (68) is rotated in a direction opposite to the direction along which the removal section (61) protrudes (opposite to the direction to which the filter attachment portion (68) opens), thereby making it possible to remove only the filter attachment portion (68), which holds the air filter (30) from below, from under the shaft insertion portion (33) of the air filter (30), with the fastening screw (28a) being screwed into the filter turning shaft (28). As mentioned above, the inner diameter of the shaft insertion portion (33) of the air filter (30) is larger than the diameter of the filter turning shaft (28) of the partition plate (25) and the diameter of the fastening screw (28a), and that is why the air filter (30) can be removed from under the shaft insertion portion (33).

With this attachment structure of the air filter (30), the air filter (30) can be easily detached without removing the fastening screw (28a).

The lower side (bottom side) of the storage section (62) protrudes to have an arc shape in cross section. The dust removed from the rotating brush (51) with the cleaning brush (52) falls into the arc portion of the storage section (62) and is stored in the arc portion. Further, the storage section (62) has a cylindrical shape, and is open at both ends (66, 67) along its longitudinal direction. A damper box (81) of the dust transfer device (80), described later, is connected to the first end portion (66) of the storage section (62), and a transfer duct (88) of the dust transfer device (80), described later, is connected to the second end portion (67) of the storage section (62).

Further, as shown in FIG. 10, the dust storage container (60) is provided with a storage amount detection device (70) for detecting an amount of dust stored in the storage section (62). The storage amount detection device (70) includes an LED (72) and a phototransistor (73) accommodated in a sensor box (71). The sensor box (71) is provided closer to the second end portion (67) of the storage section (62) of the dust storage container (60), and extends in a transverse direction of the storage section (62) and covers the bottom portion of the storage section (62) (see FIGS. 5, 8 and 9). The LED (72) and the phototransistor (73) are disposed in the sensor box (71) so as to oppose each other, with the storage section (62) interposed therebetween in the transverse direction of the storage section (62). Further, a first transparent window (64) and a second transparent window (65), which are respectively corresponding to the LED (72) and the phototransistor (73), are formed in the wall of the storage section (62).

In the storage amount detection device (70) according to the above structure, light emitted by the LED (72) passes through the transparent window (64) and then the second transparent window (65), and thereafter, the luminous intensity of the light is detected by the phototransistor (73). The amount of dust stored in the storage section (62) (i.e., the amount of dust filling the storage section (62)) can be checked according to the luminous intensity detected by the phototransistor (73). Specifically, in the case where the amount of dust stored is small, the transmittance of light passing from the first transparent window (64) to the second transparent window (65) in the storage section (62) is high, and therefore, the luminous intensity detected by the phototransistor (73) is high. In contrast, in the case where the amount of dust stored is large, the transmittance of light passing from the first transparent window (64) to the second transparent window (65) in the storage section (62) is low, and therefore, the luminous intensity detected by the phototransistor (73) is low. Therefore, according to the storage amount detection device (70), it is possible to determine that a large amount of dust is stored in the storage section (62) in the case, for example, where the luminous intensity is a certain value or less. Thus, if the storage amount detection device (70) detects that the dust storage amount in the storage section (62) is large even after a dust transfer operation by the dust transfer device (80), described later, for transferring dust in the storage section (62), it is possible to determine that the dust collecting box (90), to which the dust is to be transferred, is full.

Further, as described above, the storage amount detection device (70) is provided closer to the second end portion (67) of the storage section (62) that is connected to a transfer duct (88). Therefore, even in the case where the second end portion (67) is clogged with dust while the dust is transferred and stored in the dust collecting box (90) through the transfer duct (88), the clogging can be detected by the storage amount detection device (70). That is, according to the structure of the present embodiment, the storage amount detection device (70) is provided at a location close to the second end portion (67) of the storage section (62) to which the transfer duct (88) is connected, because that portion is most likely to be clogged with the dust. As a result, it is possible to reliably detect the clogging with dust.

The dust transfer device (80) includes the above-mentioned damper box (81) and the transfer duct (88), and an introduction duct (86) and a suction duct (87), as shown, for example, in FIGS. 4, 5, 8, 12, and 13.

Figure 12:
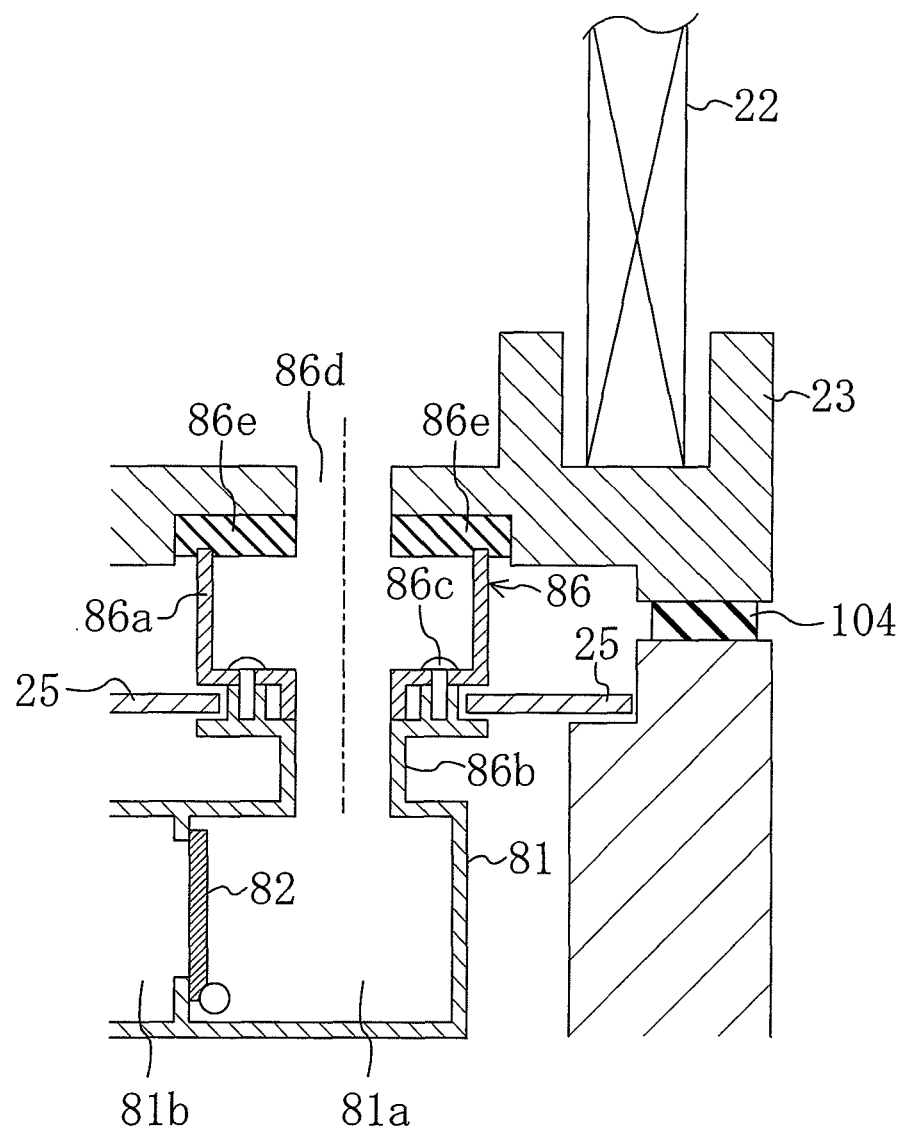
FIG. 12 is an enlarged cross section of an introduction duct.
Figure 13:
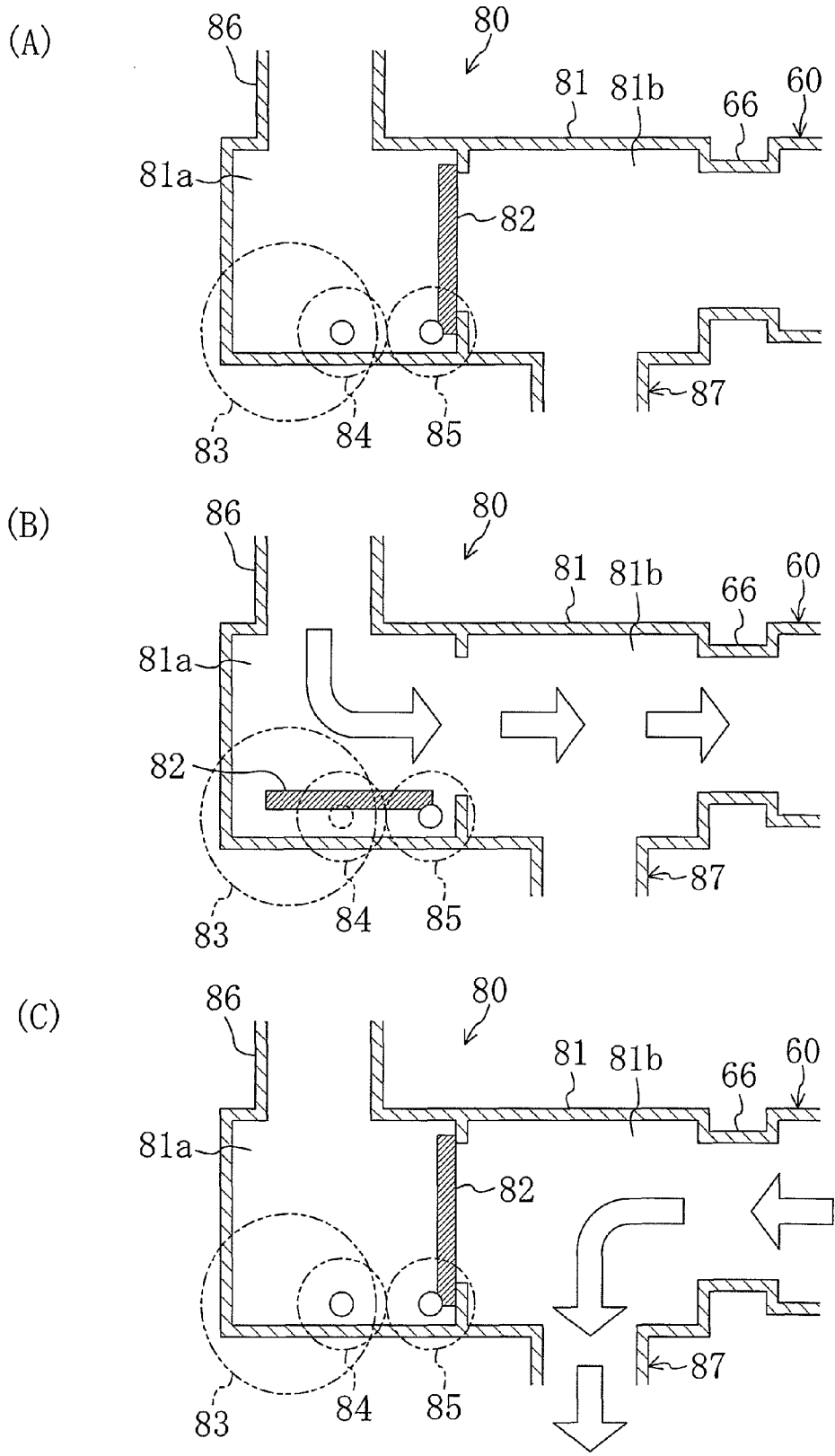
FIG. 13 shows cross sections for illustrating a movement of a damper of the dust transfer device.

The damper box (81) has a rectangular parallelepiped shape. One end of the damper box (81) along the longitudinal direction thereof is connected to the first end portion (66) of the storage section (62). A damper (82), which is an opening and closing member, is provided in the damper box (81) as shown in FIGS. 12 and 13. When the damper (82) is closed, the interior space of the damper box (81) is partitioned into two chambers along the longitudinal direction of the damper box (81). That is, the interior space of the damper box (81) is partitioned by the damper (82) into a first chamber (81*a*) on the other side and a second chamber (81*b*) on the one side to which the dust storage container (60) is connected. As mentioned above, the first end portion (66) of the storage section (62) is connected to the second chamber (81*b*) formed on the one side of the damper box (81). The second chamber (81*b*) and the storage section (62) communicate with each other.

As shown in FIGS. 9 and 13, the dust transfer device (80) includes a damper drive motor (83), a drive gear (84), and a driven gear (85), for opening and closing the damper (82). The drive gear (84) is connected to a drive shaft of the damper drive motor (83). The driven gear (85) is connected to a rotating shaft of the damper (82). The drive gear (84) and the driven gear (85) are disposed to engage each other. This structure allows the rotation of the damper drive motor (83) to be transferred to the rotating shaft of the damper (82) by way of the gears (84, 85). As a result, the damper (82) rotates about its rotating shaft according to the rotation of the damper drive motor (83), and thereby performing opening and closing movements.

One end of the introduction duct (86) is connected to the upper surface of the damper box (81), and communicates with the first chamber (81*a*) in the damper box (81). On the other hand, as shown in FIG. 12, the other end of the introduction duct (86), which extends vertically upward from the damper box (81) and goes through the partition plate (25) between the cleaning unit (100) and the main unit (10), is connected to a protrusion portion of the drain pan (23) of the main unit (10). The introduction duct (86) includes an upstream duct (86*a*) and a downstream duct (86*b*) each having a circular cross section. The two members (86*a*, 86*b*) are connected to each other in a vertical direction with a fastening screw (86*c*).

The cross-sectional area (the flow path area) of the upstream duct (86*a*) is larger than the cross-sectional area (the flow path area) of the downstream duct (86*b*). The lower end (the lower side in FIG. 12) of the downstream duct (86*b*) is connected to the upper surface of the damper box (81), whereas the upper end (the upper side in FIG. 12) of the upstream duct (86*a*) comes in contact with the horizontally-extending protrusion portion of the drain pan (23), with a sealing member (86*e*) interposed therebetween. An introduction opening (86*d*), which is a through hole, is formed in the protrusion portion of the drain pan (23). The introduction opening (86*d*) allows the upstream duct (86*a*) to communicate with the space on the indoor fan (21) side. That is, the introduction duct (86) is configured to introduce the air blown by the indoor fan (21) into the damper box (81).

Further, the connecting portion between the upstream duct (86*a*) and the downstream duct (86*b*) of the introduction duct (86) is located at a through hole in the partition plate (25). Specifically, the ducts (86*a*, 86*b*) are connected to each other in such a manner that the periphery of the through hole formed in the partition plate (25) is sandwiched between a bottom plate of the upstream duct (86*a*) and an upper end flange of the downstream duct (86*b*). This structure allows the upper end of the introduction duct (86) to be connected to the bell mouth (24), with the periphery of the through hole in the partition plate (25) sandwiched between a bottom plate of the upstream duct (86*a*) and an upper end flange of the downstream duct (86*b*) to avoid dropping of the introduction duct (86).

Further, because of the structure in which the periphery of the through hole formed in the partition plate (25) is sandwiched between the bottom plate of the upstream duct (86*a*) and the upper end flange of the downstream duct (86*b*) as described above, the connecting portion between the upstream duct (86*a*) and the downstream duct (86*b*) is rotatable with respect to the partition plate (25). Moreover, according to the present embodiment, the portion at which the upstream duct (86*a*) and the sealing member (86*e*) come in contact with each other is rotatable as well. Therefore, the introduction duct (86), the damper box (81), and the dust removal device (50) can rotate integrally with each other about the shaft (introduction opening) of the introduction duct (86).

Figure 14:
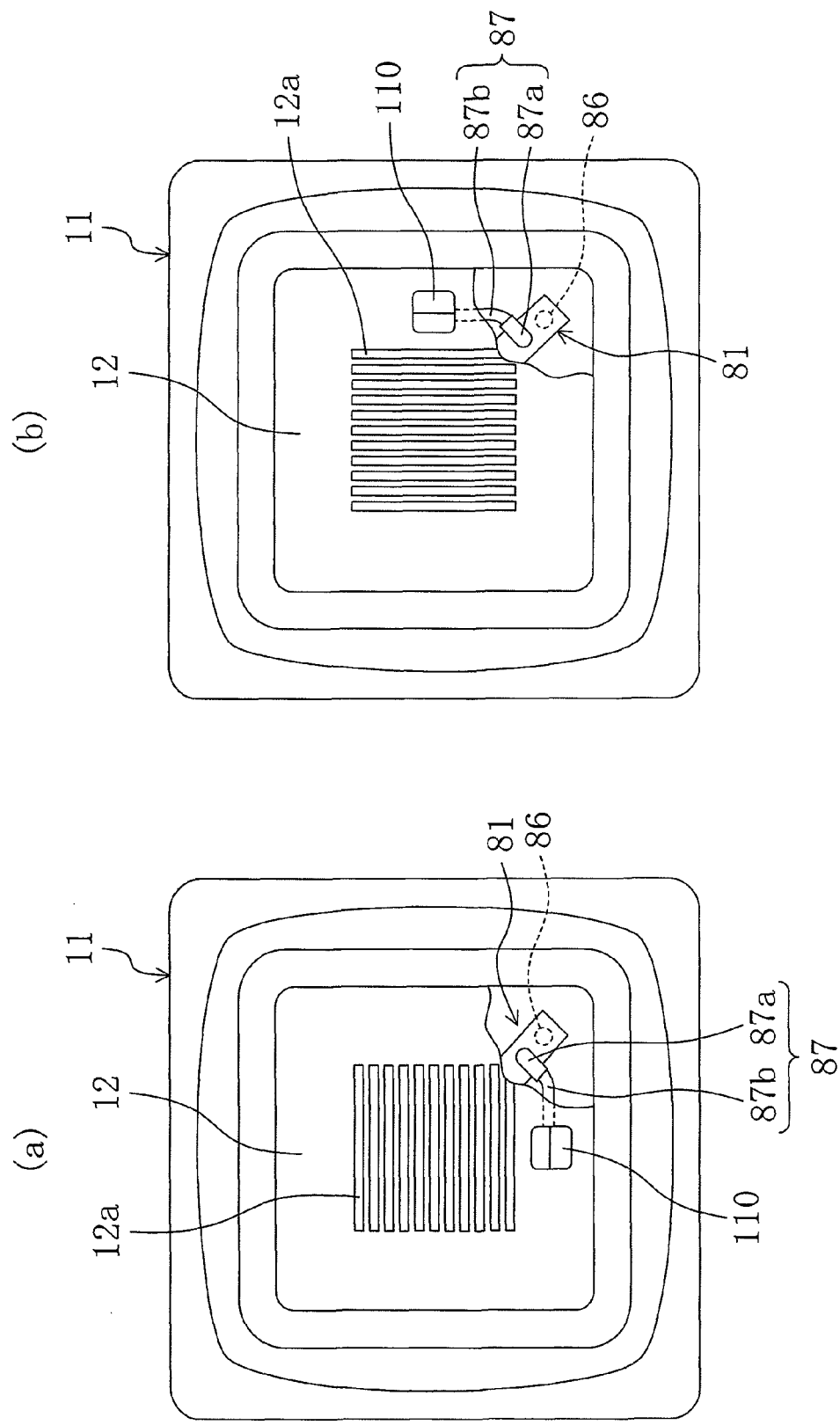
FIG. 14 shows partial cross sections from which part of a decorative panel viewed from the room side is omitted.
Figure 15:
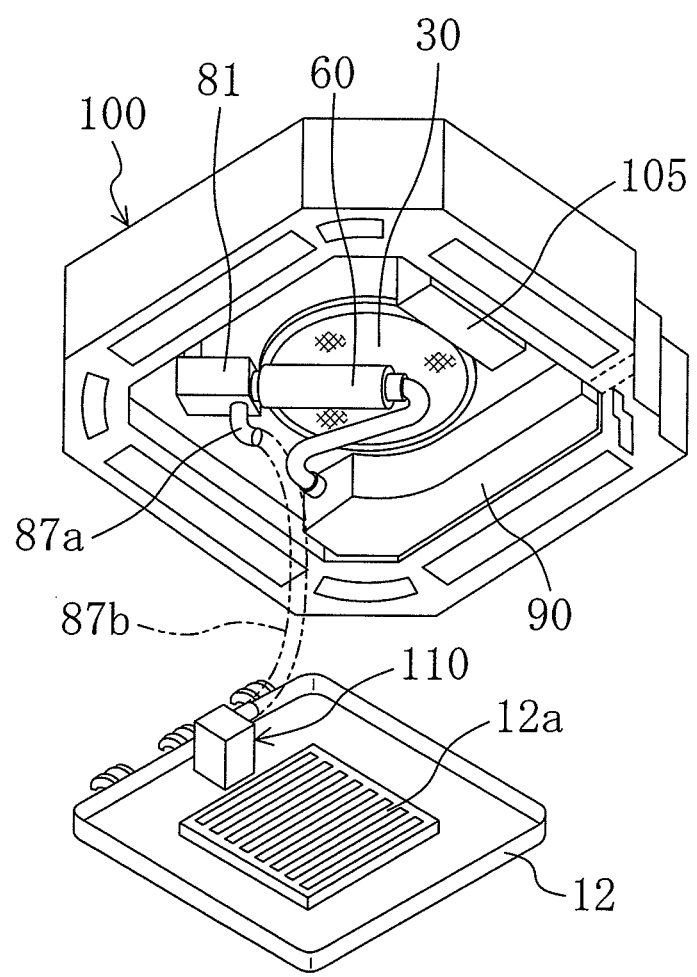
FIG. 15 is an oblique view for illustrating a connecting relationship between a damper box and a nozzle insertion portion.

One end, i.e., intake side, of the suction duct (87) is connected to a bottom surface on the one end of the damper box (81), and communicates with the second chamber (81*b*) in the damper box (81), as shown, for example, in FIGS. 13 and 14. The other end, i.e., discharge side, of the suction duct (87) is connected to a nozzle insertion portion (110) provided on the decorative panel (11). The nozzle insertion portion (110) has an opening for inserting a nozzle (150) of the cleaner for suction, as described in detail below.

Specifically, the suction duct (87) includes a connecting pipe (87*a*) rotatably attached to the lower surface of the damper box (81), and a flexible duct (87*b*) for connecting the connecting pipe (87*a*) and the nozzle insertion portion (110) of the decorative panel (11), as shown in FIG. 14. Owing to the structure in which the connecting pipe (87*a*) is rotatably connected to the damper box (81) and in which the connecting pipe (87*a*) and the nozzle insertion portion (110) are connected by the deformable, flexible duct (87*b*) as described above, the damper box (81) and the nozzle insertion portion (110) can be reliably connected to each other even if the direction of the slit portion (12*a*) of the inlet grill (12) is changed at the time of installation when viewed from below, as shown in FIG. 14. Thus, the direction of the slit portion (12*a*) of the inlet grill (12) can be freely changed according to the user's preferences.

As shown in FIGS. 2-4, one end of the transfer duct (88) is connected to the second end portion (67) of the storage section (62) of the dust storage container (60), and the other end of the transfer duct (88) is connected to a dust collecting box (90), described later. The transfer duct (88) allows the dust storage container (60) and the dust collecting box (90) to communicate with each other, and dust can be transferred through the transfer duct (88). The transfer duct (88) is made of a flexible tube.

In the dust transfer device (80) having the above structure, the damper (82) in the damper box (81) is closed during a normal operation performing heating and cooling operations (see FIG. 13 (A)). Thus, the air blown by the indoor fan (21) is not guided into the second chamber (81*b*) of the damper box (81). On the other hand, the damper (82) of the damper box (81) is opened in the case where the dust in the dust storage container (60) is transferred to the dust collecting box (90) (see FIG. 13 (B)). Thus, the air blown by the indoor fan (21) is guided into the dust storage container (60) through the introduction duct (86) and the damper box (81). As a result, the dust in the dust storage container (60) flows through the transfer duct (88) together with the guided air, and is transferred into the dust collecting box (90). In other words, the dust in the dust storage container (60) can be removed from inside the dust storage container (60) and can be transferred to a certain place by opening the damper (82) in the damper box (81) and utilizing the air blown by the indoor fan (21).

Further, in the dust transfer device (80), the damper (82) in the damper box (81) is closed as well, in the case where the dust collected in the dust collecting box (90) is discharged to the outside of the casing (10) (FIG. 13 (C)). In this case, as described in detail later, the dust in the dust collecting box

(90) is suctioned by a cleaner from the nozzle insertion portion (110) through the transfer duct (88), the damper box (81), and the suction duct (87).

As mentioned above, the dust collecting box (90) is for storing dust transferred from inside the dust storage container (60). The dust collecting box (90) has a slightly elongated, generally rectangular parallelepiped shape, and is located under the partition plate (25) like the dust storage container (60) as shown, for example, in FIGS. 3 and 4. Further, the dust collecting box (90) is positioned on a lateral side of the air filter (30) along one edge of the partition plate (25) such that the dust collecting box (90) does not overlap with the air filter (30) in plan view. In the present embodiment, the dust collecting box (90) is positioned at a location that is opposite to the damper box (81) with the air filter (30) interposed therebetween, and under the electrical component box (20) and the service cover (106) of the main unit (10) (see FIGS. 21-23). Moreover, in order to reliably prevent interference with the air filter (30), the dust collecting box (90) is configured such that a side plate on the air filter (30) side has an arc shape so as to correspond to the outer periphery of the air filter (30).

Further, a side surface of one end portion (one side portion) of the dust collecting box (90) is provided with a receiving opening (94), and the other end of the transfer duct (88) is connected to the receiving opening (94). On the other hand, the other end portion (the other side portion) of the dust collecting box (90) goes through the chamber casing (101) of the cleaning unit (100), and the end surface of the other end portion is provided with a discharge opening (91) that is open to the outside of the chamber casing (101). In other words, the dust collecting box (90) is provided with the discharge opening (91) at its one end that is opposite to the side to which the transfer duct (88) is connected, and therefore, air can flow smoothly in the interior of the dust collecting box (90) in its longitudinal direction. In addition, part of the dust collecting box (90) that is on the discharge opening (91) side has a cross-sectional area smaller than the cross-sectional area of the other part of the dust collecting box (90). Here, the reference character 93 in FIG. 4 is a sealing member for sealing, from the interior side of the casing, the portion of the dust collecting box (90) that goes through the chamber casing (101).

Further, a filter (92) is provided in the dust collecting box (90) at a location close to the discharge opening (91). When dust is transferred into the dust collecting box (90) from the dust storage container (60), the filter (92) captures the transferred dust and does not allow the dust to flow out through the discharge opening (91), while allowing the air to be discharged through the discharge opening (91). Further, when dust is taken from the dust collecting box (90) by suction of a cleaner, room air flows into the dust collecting box (90) through the discharge opening (91). However, dust in the air which flows into the dust collecting box (90) is captured by the filter (92).

As described above, the pressure in the dust collecting box (90) is properly balanced by the intake and discharge of air through the discharge opening (91). Thus, the dust transfer operation to the dust collecting box (90) and the dust discharge operation from the dust collecting box (90) are properly done.

The electrical component box (105) accommodates electronic components for controlling the actuation of the filter drive device (40), the dust removal device (50), and the dust transfer device (80), etc, in the cleaning unit (100). The electronic components in the electrical component box (105) are electrically connected, for example via signal lines, to the electronic components in the electrical component box (20) of the main unit (10) so that signals can be transmitted.

Further, as shown in FIG. 3, the electrical component box (105) is positioned under the partition plate (25) of the cleaning unit (100), on a side next to the side along which the dust collecting box (90) is located, and opposite to the damper box (81) connected to the dust storage container (60) with the air filter (30) interposed between the damper box (81) and the electrical component box (105). With this structure, it is possible to reliably prevent the interference of the electrical component box (105) with the dust storage container (60) when the dust storage container (60) is rotated to detach, for maintenance, the service cover (106) and the air filter (30) provided at the partition plate (25) of the cleaning unit (100).

<Nozzle Insertion Portion>

Next, a nozzle insertion portion (110) to which the suction duct (87) is connected will be described in detail with reference to the FIGS. 15-18. The nozzle insertion portion (110) is provided outside the slit portion (12a) of the inlet grill (12). The nozzle insertion portion (110) includes a box-like cover member (111) provided on the ceiling side of the inlet grill (12), as shown in FIG. 16. The cover member (111) is constituted by an upper cover (116) having a rectangular parallelepiped shape, and a downwardly opening, box-like lower cover (117), which are connected one above the other. A first space (114) is formed in the upper cover (116), and a second space (115) is formed in the lower cover (117).

The upper cover (116) is rotatably connected to the lower cover (117). Specifically, the bottom face of the upper cover (116) is provided with a circular opening (116a), and the upper surface of the lower cover (117) is provided with an engagement portion (117a) which can be engaged with the periphery of the opening (116a). The upper cover (116) can rotate relative to the lower cover (117), with the periphery of the opening (116a) being engaged with the engagement portion (117a). That is, the engagement portion (117a) of the lower cover (117) includes a cylindrical body (117b) which corresponds to the opening (116a) of the upper cover (116) and which protrudes upward from the upper surface of the lower cover (117), and a protrusion portion (117c) which is provided at the end of the protrusion of the cylindrical body (117b) and which protrudes radially outward. As shown in FIG. 16, the periphery of the opening (116a) formed in the lower surface of the upper cover (116) is sandwiched between the protrusion portion (117c) and the upper surface of the lower cover (117), and thereby, the upper cover (116) can be rotatably engaged with the lower cover (117). Although not specifically shown in the drawing, the upper cover (116) is divided in its width direction (in a direction orthogonal to FIG. 16). Thus, the upper cover (116) may be attached to the lower cover (117) such that the engagement portion (117a) of the lower cover (117) is fit between the divided parts of the upper cover (116).

One of side surfaces of the upper cover (116) is inclined so as to extend upward and outward. The side surface is provided with an opening (116b) for duct that is open obliquely downward. The other end of the flexible duct (87b) of the suction duct (87) is detachably connected to the opening (116b) for duct in a manner as described below. The opening (116b) for duct is covered with a valve (126) from inside the upper cover (116). The valve (126) is rotatably supported by the upper cover (116) at the upper end of the valve (126), and is provided with a protrusion portion (126a) which protrudes from the upper end of the valve (126) toward the interior of the upper cover (116). As is described in detail below, the protrusion portion (126a) is in contact with part of a piston member (120), and the valve (126) is configured to be opened and closed by the up-and-down movements of the piston member (120).

The inlet grill (12) is provided with an opening (12b) which corresponds to the lower cover (117). Two plate-like cover members (112, 112) (covers) are arranged next to each other in the opening (12b), and are attached to the lower cover (117) such that the cover members (112, 112) can rotate upward about the inner periphery portions of the opening (12b) which oppose to each other. That is, the cover members (112) are disposed so as to be open upward like double doors. Further, a spring member (113) is provided between the rotational axis side of the respective cover members (112) and the inner surface of the lower cover (117). The cover members (112) are biased by the spring member (113) in a closing direction. Thus, the cover members (112) are always closed in the state in which the nozzle (150) of the cleaner is not inserted as shown in the FIG. 16 (A). Therefore, it is difficult to see the inside of the nozzle insertion portion (110) from the room side, which can prevent dust from flowing into the room.

The inner surface of the cylindrical body (117b) of the engagement portion (117a) of the lower cover (117) constitutes an insertion through hole (117d) into which a nozzle connecting portion (121), described later, of the piston member (120) is inserted. That is, the body (117b) of the engagement portion (117a) serves as a guide when the nozzle connecting portion (121) slides. This structure enables the nozzle connecting portion (121), i.e., the piston member (120), to move up and down smoothly.

The piston member (120) includes a nozzle connecting portion (121) with which the nozzle (150) of a cleaner comes into contact, and a shaft (122) integrally formed with the nozzle connecting portion (121) and located on the nozzle connecting portion (121). The nozzle connecting portion (121) has a hemispherical shape which protrudes into the room side, and its upper side is covered with a flat plate (121a). The end of the protrusion of the nozzle connecting portion (121) is provided with a hole (121b). This structure allows the nozzle (150) of a cleaner having different cross section or size to come in contact with the nozzle connecting portion (121) with reliability, and allows dust to be suctioned and collected through the hole (121b).

Figure 17:
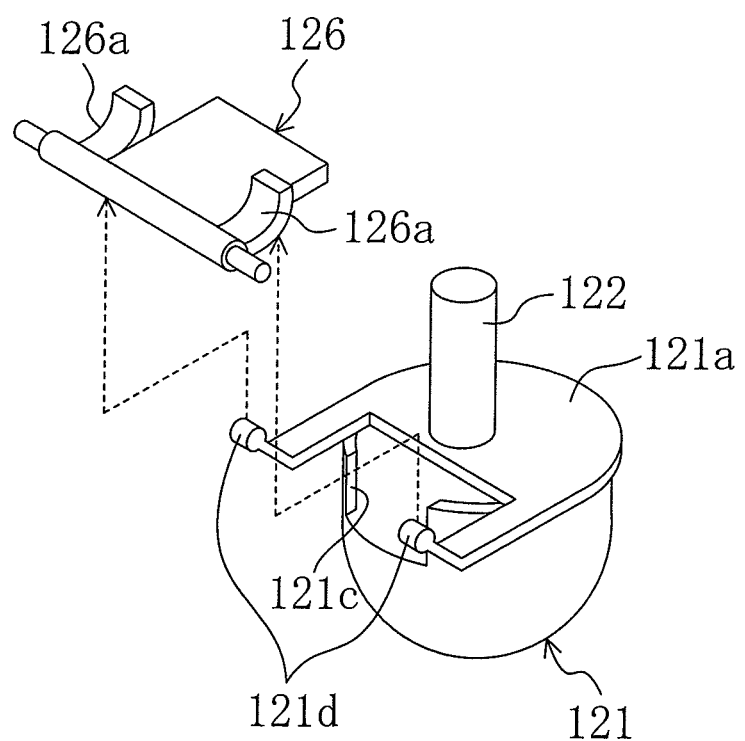
FIG. 17 is an oblique view for illustrating structures of a nozzle connecting portion and a valve.

The nozzle connecting portion (121) is a hollow structure, and as shown in FIG. 17, part of the trailing end side (the upper side in the drawing) of the nozzle connecting portion (121) is provided with an opening (121c). The opening (121c) is formed so as to be open obliquely upward from the trailing end side of the hemispherical portion of the nozzle connecting portion (121) to part of the flat plate (121a). The left and right sides of the opening (121c) are provided with contacting portions (121d) which extend obliquely upward from the flat plate (121a). The contacting portions (121d) come in contact with the protrusion portion (126a) provided at the valve (126) for covering, from inside the upper cover (116), the opening (116b) for duct that is formed in the upper cover (116). That is, the protrusion portion (126a) of the valve (126) is provided at both end portions of the valve (126) along the width direction of the valve (126), and curves upward. Therefore, when the nozzle connecting portion (121) moves upward, the protrusion portions (126a) of the valve (126) are pushed up by the contacting portions (121d) of the nozzle connecting portion (121). As a result, it is possible to keep the valve (126) open as shown in FIG. 16 (B).

The shaft (122) is integrally formed with the flat plate (121a) of the nozzle connecting portion (121) so as to extend upward. The upper end of the shaft (122) is located in a cylindrical guide (116c) formed on the inner side of the upper surface of the upper cover (116). This structure allows the nozzle connecting portion (121) to move up and down more smoothly. Further, a spring member (125) is provided on the outer periphery side of the shaft (122) such that the spring member (125) is interposed between the lower end portion of the guide (116c) and the flat plate (121a) of the nozzle connecting portion (121). The spring member (125) biases the nozzle connecting portion (121) in a downward direction (to the lowest point), and allows the nozzle connecting portion (121) to move upward when the nozzle (150) of the cleaner pushes the nozzle connecting portion (121) from below. The nozzle connecting portion (121) is configured such that the periphery of the flat plate (121a) comes in contact with the protrusion portion (117c) of the engagement portion (117a) of the lower cover (117) when the nozzle connecting portion (121) is biased in a downward direction by the spring member (125).

According to the above structure, when the nozzle (150) of the cleaner is pushed against the nozzle connecting portion (121) from below, the nozzle connecting portion (121) moves upward against a biasing force of the spring member (125), and as a result, the entire opening (121c) formed in the nozzle connecting portion (121) is open toward the first space (114) in the upper cover (116). Further, along with the upward movement of the nozzle connecting portion (121), the contacting portions (121d) provided at left and right sides of the opening (121c) of the nozzle connecting portion (121) push up the protrusion portions (126a) of the valve (126) for covering, from inside the upper cover (116), the opening (116b) for duct that is formed in the upper cover (116). As a result, the valve (126) is opened, and the suction duct (87) and the interior space of the nozzle connecting portion (121) communicate with each other through the opening (116b) for duct.

In other words, when the nozzle connecting portion (121) is displaced upward, the interior space of the nozzle connecting portion (121) communicates with the interior of the dust collecting box (90) through the opening (121c) formed in the nozzle connecting portion (121), the first space (114) in the upper cover (116), the suction duct (87), the damper box (81), the dust storage container (60), and the transfer duct (88). If the cleaner is actuated in this state, the dust stored in the dust collecting box (90) is suctioned by the nozzle (150) of the cleaner, due to a suction force of the cleaner, through the transfer duct (88), the dust storage container (60), the damper box (81), the suction duct (87), the first space (114) in the cover member (111), and the nozzle connecting portion (121).

On the other hand, when the nozzle connecting portion (121) is not pushed up by the nozzle (150) of the cleaner, the valve (126) of the opening (116b) for duct is not pushed up by the contacting portions (121d) of the nozzle connecting portion (121), and therefore, the valve (126) of the opening (116b) is closed as shown in FIG. 16 (A). This is because the nozzle connecting portion (121) is biased in a downward direction by the spring member (125). As a result, the nozzle connecting portion (121) and the suction duct (87) are disconnected to each other, and therefore, dust can be prevented from diffusing into the room.

The side surface and the top surface of the interior side of lower cover (117) is provided with nozzle guide portions (118) for having the nozzle (150) of the cleaner reliably come in contact with the nozzle connecting portion (121). Each nozzle guide portion (118) is a plate-like member formed across the side surface and the top surface of the interior side of the lower cover (117), and two nozzle guide portions (118) are provided for each side of the top surface of the rectangular parallelepiped shaped lower cover (117).

A connecting structure of the flexible duct (87b) will be described in detail below. As shown in FIG. 18, a connecting portion (131) at which the nozzle insertion portion (110) and the flexible duct (87b) are connected together includes a first connecting portion (132) provided at the upper cover (116) of the nozzle insertion portion (110), and a second connecting portion (133) provided at an end of the flexible duct (87b) which corresponds to the first connecting portion (132). The first connecting portion (132) and the second connecting portion (133) are engaged with each other.

The first connecting portion (132) is a generally cylindrical member provided with a protrusion portion (132a) which is formed on the outer peripheral surface of the generally cylindrical member and which extends all around the outer peripheral surface of the generally cylindrical member. An engagement portion (133c), described later, of the second connecting portion (133) engages with the protrusion portion (132a).

The second connecting portion (133) includes a main body (133a) made of the generally cylindrical member whose diameter is larger than the diameter of the first connecting portion (132). A claw (133b) is integrally formed on the outer peripheral surface of the main body (133a). The claw (133b) includes: the cylindrical engagement portion (133c) which extends along an axial direction of the flexible duct (87b) and which engages with the protrusion portion (132a) of the first connecting portion (132); a lever (133d) which is a protrusion extending in a direction opposite to the direction along which the engagement portion (133c) extends; and an elastic deformation portion (133e) which connects the engagement portion (133c) and the lever (133d) to the main body (133a) in an elastic manner, at a middle portion of the engagement portion (133c) and the lever (133d). The lever (133d) extends radially outward as it is closer to the tip end of the lever (133d). This structure enables the engagement portion (133c), which extends in a direction opposite to the direction along which the lever (133d) extends, to be displaced radially outward by displacing the lever (133d) radially inward and causing deformation of the elastic deformation portion (133e). In contrast, when the lever (133d) is returned to its original position, the engagement portion (133c) is returned to its original position because of an elastic restoring force of the elastic deformation portion (133e).

Thus, to engage the engagement portion (133c) of the second connecting portion (133) with the protrusion portion (132a) of the first connecting portion (132), the engagement portion (133c) is brought into contact with the protrusion portion (132a), thereby causing an elastic deformation of the elastic deformation portion (133e), which elastically supports the engagement portion (133c), and displacement of the engagement portion (133c) in a radially outward direction. As a result, the engagement portion (133c) can be engaged with the protrusion portion (132a) (see FIG. 18 (B)). On the other hand, to detach the second connecting portion (133) from the first connecting portion (132), the lever (133d) is deformed in a radially inward direction, thereby causing displacement of the engagement portion (133c) in a radially outward direction and separating the engagement portion (133c) from the protrusion portion (132a) of the first connecting portion (132). As a result, the engagement portion (133c) and the protrusion portion (132a) are disconnected from each other.

This structure enables the flexible duct (87b) to be easily attached to or detached from the nozzle insertion portion (110), and therefore, the efficiency in performing maintenance etc. can be improved.

<Attachment Structure>

Next, an attachment structure for mounting, above the ceiling, an indoor unit (3) of the air conditioner (1) that has the above-described structure will be described with reference to FIGS. 19 and 20.

As described above, the indoor unit (3) according to the present embodiment has the structure in which the main unit (10), the cleaning unit (100) and the decorative panel (11) are stacked to each other in a vertical direction. Thus, the cleaning unit (100) and the decorative panel (11) are mounted above the ceiling after the main unit (10) is mounted above the ceiling. As shown in FIG. 20, the main unit (10) is supported on and suspended from the wall above the ceiling, using support members (140), and at the same time, the decorative panel (11) attached to the cleaning unit (100) with bolts (142) is connected to the main unit (10) with connecting members (141), thereby achieving a structure in which the cleaning unit (100) is sandwiched between the main unit (10) and the decorative panel (11). This attachment structure allows the decorative panel (11) to be attached directly to the main unit (10), thereby forming a general indoor unit (3) without a cleaning mechanism, even in the case where the cleaning unit (100) is not provided.

Figure 19:
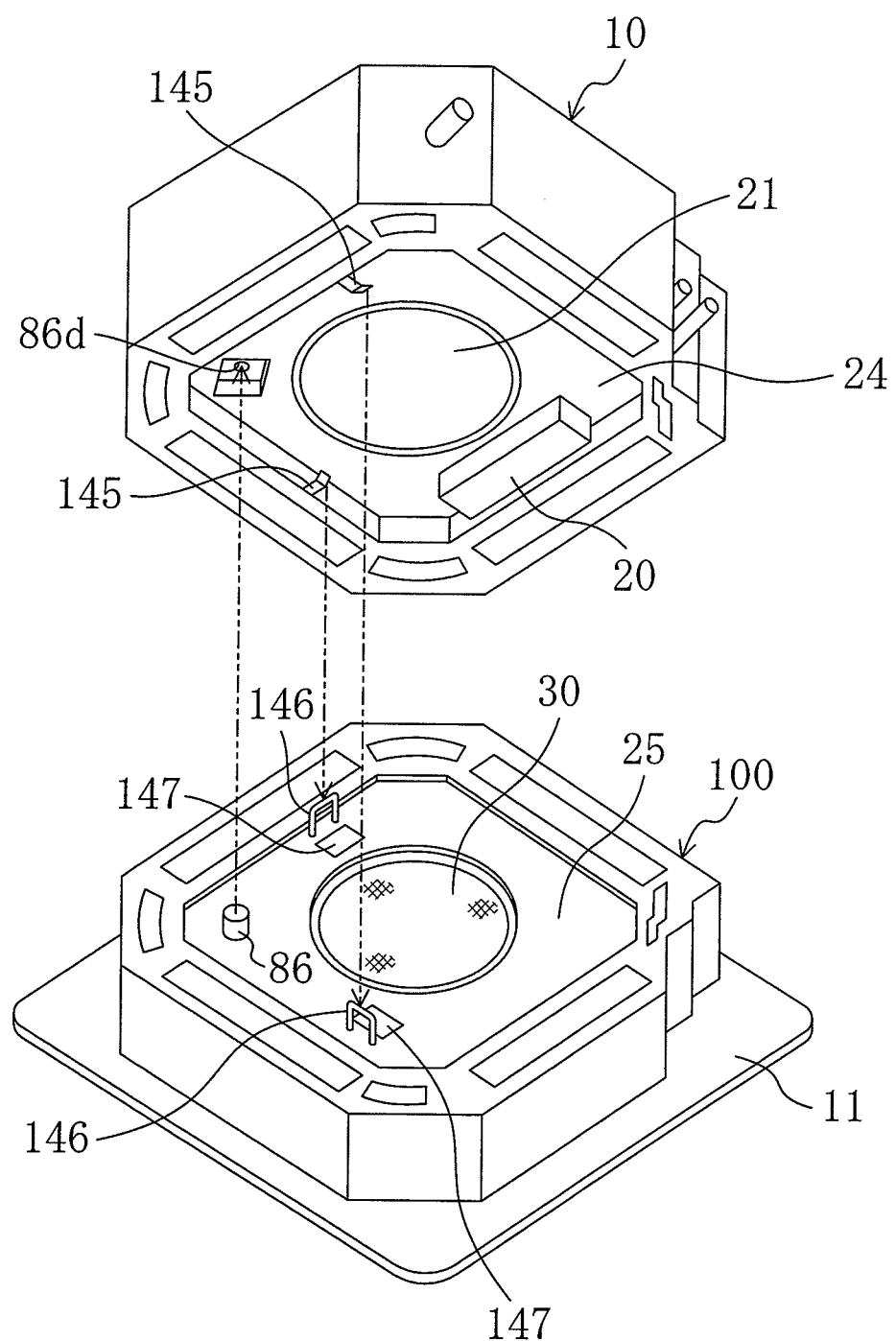
FIG. 19 is an oblique view for illustrating a structure for temporarily hanging a cleaning unit on a main unit.
Figure 20:
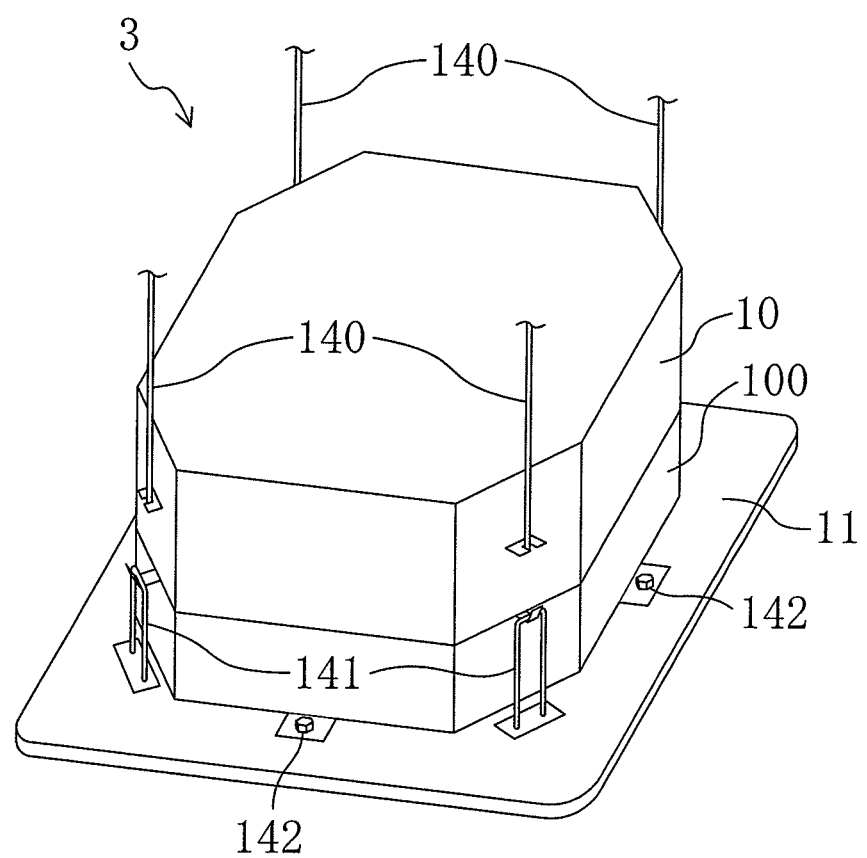
FIG. 20 is an oblique view for illustrating an indoor unit mounted above the ceiling.

In order to attach the cleaning unit (100) and the decorative panel (11) to the lower side of the main unit (10) mounted beforehand in a space above the ceiling as described above, the main unit (10) and the cleaning unit (100) are provided with hooks (145) (protrusion portions) for temporary hanging and with U-shaped fittings (146) (engagement members) for temporary hanging which engage with the hooks (145) as shown in FIG. 19.

Specifically, the main unit (10) is provided with the hooks (145, 145) which protrude toward the interior space of the main casing (18) from at least two inner surfaces of the main casing (18). Each hook (145) is bent upward at the end of the protrusion, so that the fitting (146) for temporary hanging does not easily go out of engagement with the hook (145). Further, the hooks (145,145) are positioned at a location lower than the bell mouth (24) in the main unit (10), and protrude from the walls which constitute part of the drain pan (23).

The cleaning unit (100) is provided with the inverted U-shaped fittings (146, 146) for temporary hanging which are located on the top surface of the partition plate (25) and which correspond to the hooks (145, 145). That is, the fittings (146) for temporary hanging are located on the partition plate (25) to provide insertion through holes in which the hooks (145) can be inserted. Further, the partition plate (25) of the cleaning unit (100) is provided with transparent portions (147) located close to the fittings (146) for temporary hanging. The transparent portions (147) are located closer to the center of the partition plate (25) (air filter (30) side) than the fittings (146) for temporary hanging, so that the areas at which the hooks (145, 145) of the main unit (10) and the fittings (146) for temporary hanging of the cleaning unit (100) are engaged with each other can be checked when the cleaning unit (100) is attached to the lower side of the main unit (10).

As described above, the provision of the hooks (145, 145) and the fittings (146, 146) for temporary hanging allows the cleaning unit (100) to be inserted between the main unit (10) and the decorative panel (11) attached to the main unit (10), and allows the cleaning unit (100) to be temporarily attached to the main unit (10). As a result, the efficiency in installing the cleaning unit (100) can be improved.

Moreover, the provision of the transparent portions (147) at locations on the partition plate (25) of the cleaning unit (100) which are close to the fittings (146) for temporary hanging, enables a visual check of the areas at which the hooks (145) and the fittings (146) for temporary hanging are engaged with each other when the cleaning unit (100) is temporarily hung on the main unit (10). As a result, installation can be more efficiently accomplished.

<Structure for Maintenance>

A structure will be described below which allows access to the electrical component box (20) of the main unit (10), with the cleaning unit (100) attached to the main unit (10), at the time of maintenance of the electrical component box (20).

Figure 21:
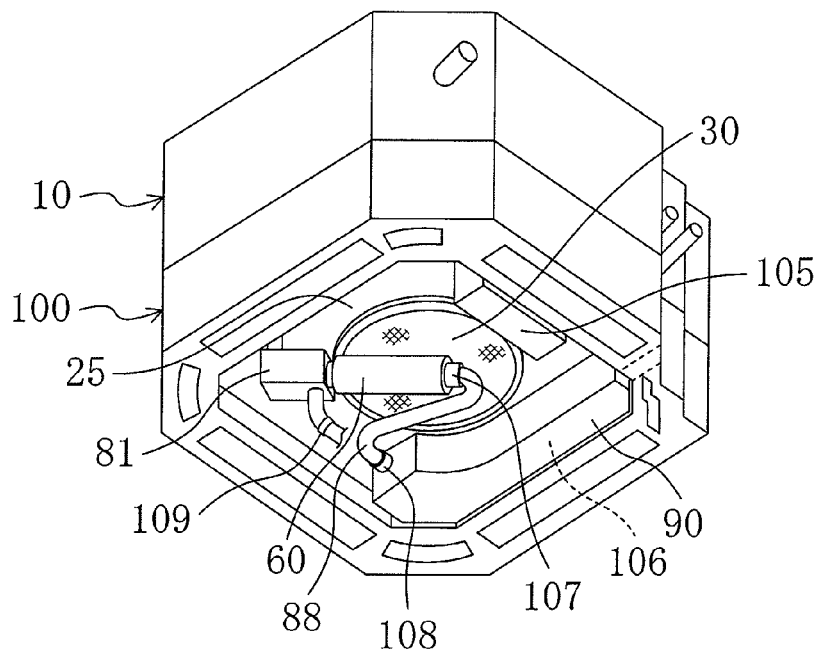
FIG. 21 is an oblique view for illustrating a main unit and a cleaning unit attached to each other.
Figure 22:
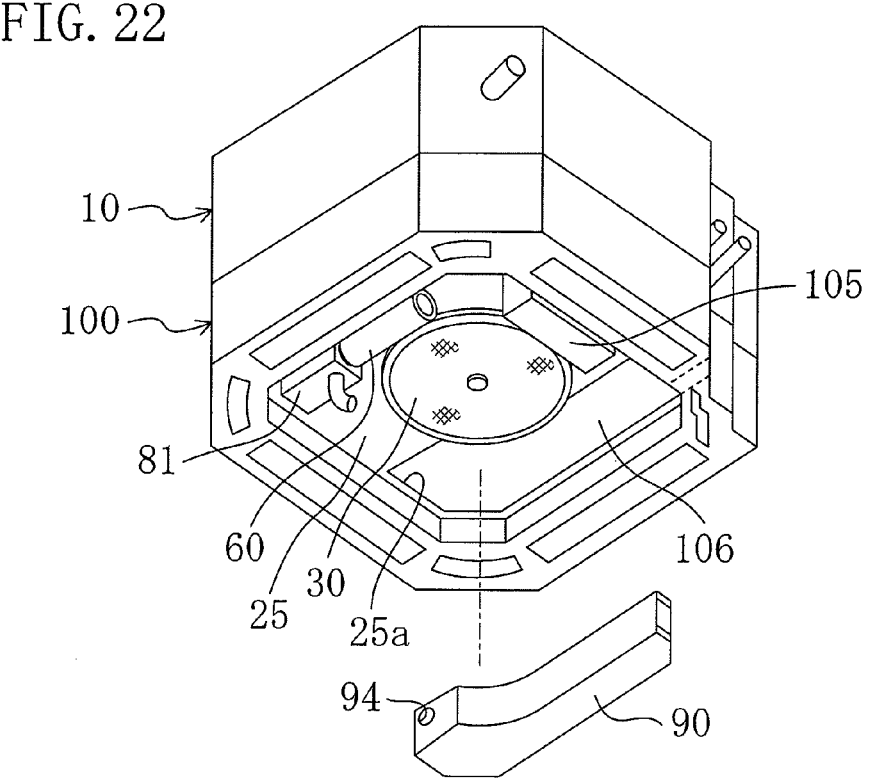
FIG. 22 is an oblique view for illustrating a cleaning unit from which a dust collecting box is detached.
Figure 23:
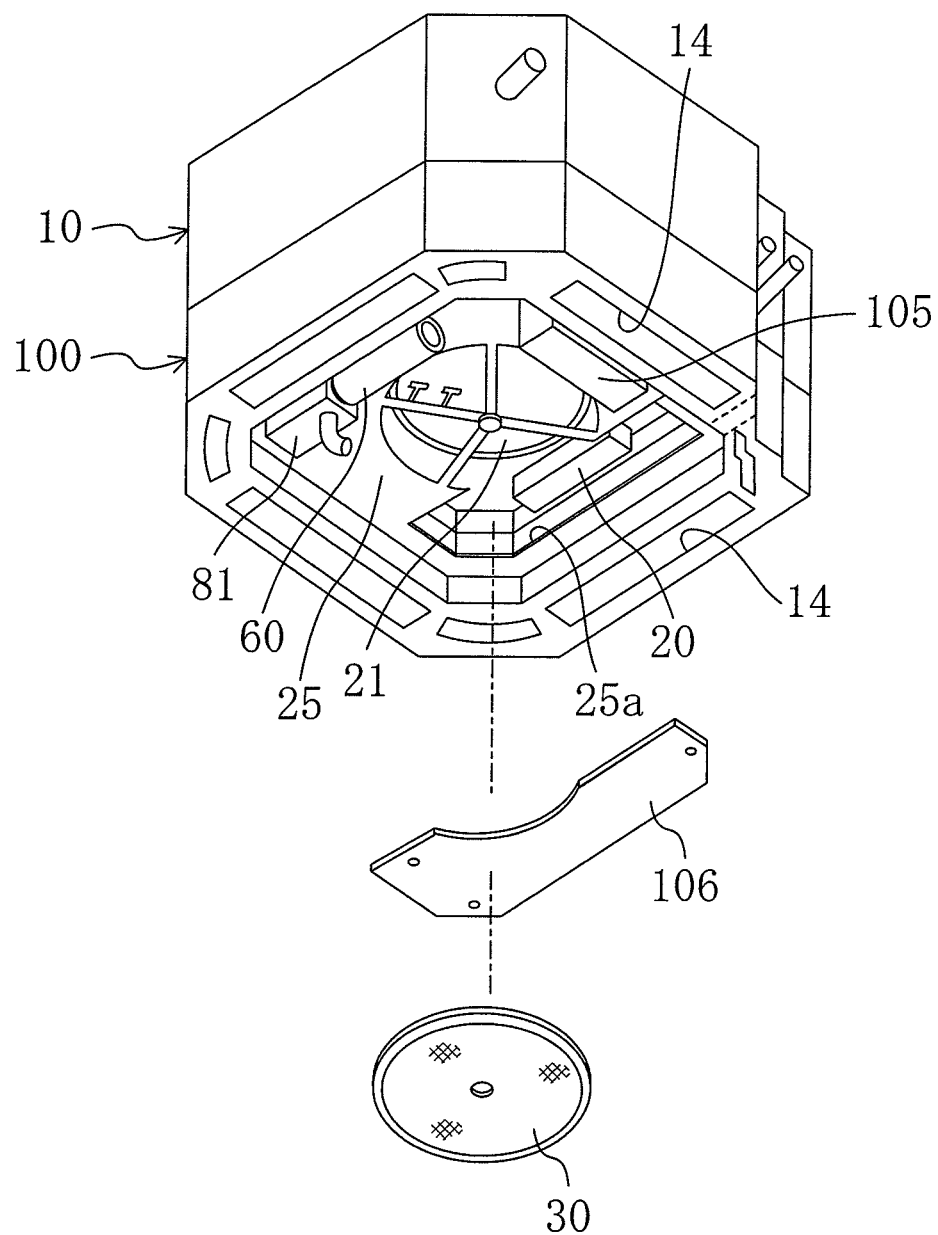
FIG. 23 is an oblique view for illustrating a cleaning unit from which an air filter and a service cover are detached.

Specifically, as shown in FIGS. 21-23, the cleaning unit (100) is configured such that the air filter (30) and the service cover (106) can be detached from the cleaning unit (100), and that the service cover (106) and the electrical component box (20) are positioned at locations which allow access to the electrical component box (20) of the main unit (10) when the service cover (106) is detached from the cleaning unit (100).

More specifically, the dust storage container (60) and the damper box (81) are rotatable about an axis of the introduction duct (86) connected to the damper box (81) as described above. Thus, to detach the air filter (30), the dust storage container (60) and the damper box (81) can be moved toward a side of the air filter (30) (see FIG. 22). Here, the dust removal position according to the present invention is the state in which at least part of the dust storage container (60) overlaps with the air filter (30) in plan view as shown in FIG. 21, and the maintenance position is the state in which the dust storage container (60) does not overlap with the air filter (30) in plan view as shown in FIG. 22.

To rotate the dust storage container (60) and the damper box (81), the transfer duct (88) which connects between the dust storage container (60) and the dust collecting box (90), and the suction duct (87) (flexible duct (87*b*)) which connects between the damper box (81) and the nozzle insertion portion (110) of the decorative panel (11), need to be detached. Thus, for easy attachment and detachment, the structures of the connecting portions (107, 108) at which the transfer duct (88) is connected to the dust storage container (60) and the dust collecting box (90), and the structure of the connecting portion (109) at which the flexible duct (87*b*) is connected to the damper box (81) (connecting portion (87*a*)), are the same as the structure of the connecting portion (131) at which the nozzle insertion portion (110) and the flexible duct (87*b*) are connected to each other (see FIG. 18).

Further, the dust collecting box (90) located in the cleaning unit (100) can be detached from the cleaning unit (100). The service cover (106) above the dust collecting box (90) is exposed when the dust collecting box (90) is detached. The service cover (106) can be detached as well. Therefore, if the air filter (30) and the service cover (106) are detached in this order as shown in FIG. 23, the electrical component box (20) in the main unit (10) is exposed, and therefore, maintenance of the electrical component box (20) becomes possible.

—Operational Behavior—

Now, operational behavior of the indoor unit (3) will be described with reference to FIGS. 11 and 13. The indoor unit (3) is capable of switching between the normal operation in which cooling and heating operations are performed, and the filter cleaning operation for cleaning the air filter (30).

<Normal Operation>

To perform the normal operation, the rotating brush (51) is rotated so that the brush (51*b*) of the rotating brush (51) can be positioned on the brush (52) side. In other words, the rotating brush (51) is rotated until the brush (51*b*) of the rotating brush (51) is not in contact with the air filter (30) so that the non-brush surface (i.e., the outer peripheral surface of the shaft (51*a*) on which no brush (51*b*) is provided) of the rotating brush (51) is opposed to the air filter (30). Further, the damper (82) of the damper box (81) is in the closed state (the state as shown in FIG. 13 (A)). The air filter (30) is not rotating, but is halted.

The indoor fan (21) is actuated in this state. Then, in the indoor unit (3), room air taken through the inlet (13) passes through the air filter (30) and flows into the bell mouth (24). When the air passes through the air filter (30), dust in the air is captured by the mesh member (37) of the air filter (30). The air having flowed into the bell mouth (24) is blown out by the indoor fan (21). The blown air is cooled or heated by heat exchange with the refrigerant of the indoor heat exchanger (22), and is then supplied into the room through each outlet (14). The room air is cooled or heated in this way. During this operation, the damper (82) of the damper box (81) is closed, and therefore, the air blown by the indoor fan (21) is not introduced to the dust storage container (60) through the damper box (81).

As described above, the air filter (30) and the brush (51*b*) of the rotating brush (51) are not in contact with each other during the normal operation. That is, the brush (51*b*) is spaced apart from the air filter (30). It is thus possible to avoid the deterioration of the brush (51*b*) due to the state in which the brush (51*b*) is always touching the air filter (30), and as a result, durability of the rotating brush (51) is increased.

<Filter Cleaning Operation>

During the filter cleaning operation, operation of the compressor (4) is stopped, and the refrigerant does not circulate in the refrigerant circuit shown in FIG. 1. The filter cleaning operation is capable of switching between a dust removal operation, a brush cleaning operation, a dust transfer operation, and a dust discharge operation. The LED (16) provided on the decorative panel (11) is on during the dust removal operation, the brush cleaning operation, and the dust transfer operation. This structure enables users to be informed that these operations are being performed.

The dust removal operation is an operation for removing dust captured by the air filter (30). The brush cleaning operation is an operation for removing dust captured by the rotating brush (51). The dust transfer operation is an operation for transferring dust from the dust storage container (60) to the dust collecting box (90). The dust discharge operation is an operation for discharging dust from the dust collecting box (90) to the outside of the indoor unit (3).

According to the present embodiment, the dust removal operation and the brush cleaning operation are performed alternately. First, the indoor fan (21) is stopped to perform the dust removal operation. Then, the brush (51*b*) of the rotating brush (51) is brought into contact with the air filter (30). In this state, the air filter (30) is turned such that the piles of the brush (51*b*) of the rotating brush (51) are stroked the wrong way by the air filter (30) (in the direction indicated by white arrow in FIG. 11 (A)). Here, rotation of the rotating brush (51) is stopped.

In this way, the dust on the air filter (30) is captured by the brush (51*b*) of the rotating brush (51) (FIG. 11 (A)). When the lever (44*a*) of the limit switch (44) of the filter drive device (40) moves, the filter drive motor (41) is stopped, and the rotation of the air filter (30) is stopped. In other words, the air filter (30) rotates at a predetermined angle and stops. Thus, the dust is removed from an area of the air filter (30) with which the brush (51*b*) of the rotating brush (51) is brought into contact. Here, the piles of the brush (51*b*) are inclined in a direction opposite to the turning direction (moving direction) of the air filter (30), and therefore, the dust on the air filter (30) can be easily scraped off by the brush (51*b*). It is thus possible to increase efficiencies of the dust removal operation by the rotating brush (51). As described above, the dust removal operation is switched to the brush cleaning operation when the rotation of the air filter (30) stops.

In the brush cleaning operation, the indoor fan (21) is still stopped, and the rotating brush (51) rotates leftward (counterclockwise) first in FIG. 11. Here, the rotating brush (51) rotates such that the brush portion (51b) in which dust still remains comes in contact with the brush portion (52b) of the cleaning brush (52) (FIG. 11 (B)). The rotating brush (51) rotates at a predetermined angle, and then stops.

After that, the rotating brush (51) rotates in a direction opposite to the above direction (in a rightward (clockwise) direction in FIG. 11). As a result, the dust captured by the brush (51b) of the rotating brush (51) is removed by the brush (52b) of the cleaning brush (52) (FIG. 11 (C)). This is because the piles of the brush (52b) of the cleaning brush (52) are inclined downward, i.e., inclined such that the piles are stroked the wrong way by the rotating brush (51) rotating clockwise, and thereby because the dust adhering to the brush (51b) of the rotating brush (51) is scraped off by the cleaning brush (52).

Further, the main portion (52a) of the cleaning brush (52) is pushed in a direction away from the rotating brush (51) because of the brush portions (51b, 52b) of the rotating brush (51) and the cleaning brush (52) coming in contact with each other. However, the main portion (52a) is biased to the rotating brush (51) by the spring (52c). Therefore, the brush portions (51b, 52b) are not spaced from each other, and the cleaning brush (52) is adequately pushed against the rotating brush (51). As a result, the dust can be reliably removed from the brush (51b) of the rotating brush (51), and captured in the brush (52b) of the cleaning brush (52). The rotating brush (51) rotates until it returns to the original position (the position shown in FIG. 11 (A)) and then stops.

After that, the rotating brush (51) again rotates leftward (counterclockwise) at a predetermined rotation angle. As a result, the dust captured by the brush (52b) of the cleaning brush (52) is scraped off by the brush (51b) of the rotating brush (51), and falls in the storage section (62) of the dust storage container (60) (FIG. 11 (D)). The dust can be scraped off from the brush (52b) of the cleaning brush (52) because the piles of the brush (51b) of the rotating brush (51) are inclined along a rotational direction. Here, the cleaning brush (52) is adequately pushed against the rotating brush (51) by the spring (52c), and therefore, the dust can be removed from the cleaning brush (52) more reliably.

In this way, the dust captured by the rotating brush (51) is removed and stored in the storage section (62) of the dust storage container (60). After that, the rotating brush (51) again rotates rightward (clockwise) to return to the original position (FIG. 11 (A)). The brush cleaning operation temporarily ends here.

After the above-described brush cleaning operation ends, the above-described dust removal operation is performed again. That is, the air filter (30) is turned again, and is stopped when the lever (44a) of the limit switch (44) is actuated again. As a result, the dust is removed from an area of the air filter (30) that is stroked by the brush (51b) of the rotating brush (51), and is captured by the brush (51b) of the rotating brush (51) (FIG. 11 (A)). The dust removal operation and the brush cleaning operation are alternately repeated as described above, removing the dust on the air filter (30) from an area to an area. When the dust is removed from the entire area of the air filter (30), the dust removal operation and the brush cleaning operation are completed. For example, when the lever (44a) of the limit switch (44) is actuated a predetermined number of times, the air filter (30) is considered as having made one turn, and the above operations are finished.

In the dust removal operation and the brush cleaning operation, the amount of dust stored in the dust storage container (60) is detected by the storage amount detection device (70). Specifically, luminous intensity of light emitted by the LED (72) is detected by the phototransistor (73). If the luminous intensity detected by the phototransistor (73) is equal to or less than a set value (a lower limit), it is considered that the amount of dust stored in the storage container (60) has reached a predetermined amount, and the operation is switched to the dust transfer operation.

In the dust transfer operation, the rotating brush (51) is stopped at the position as shown in FIG. 11 (A), and the air filter (30) is stopped as well. Further, the damper (82) of the damper box (81) is in the open state (the state as shown in FIG. 13 (B)). The indoor fan (21) is actuated in this state, and therefore, the air blown by the indoor fan (21) is introduced into the dust storage container (60) through the introduction duct (86) and the damper box (81). Thus, the dust in the dust storage container (60) is transferred into the dust collecting box (90) through the transfer duct (88) together with the air. As a result, the amount of dust stored in the dust storage container (60) decreases, and the luminous intensity detected by the phototransistor (73) increases. When the detected luminous intensity is a set value (an upper limit) or above, it is considered that almost all of the dust in the dust storage container (60) is discharged, and the dust transfer operation is finished. After that, the dust removal operation or the brush cleaning operation starts again.

The filter cleaning operation according to the present embodiment is performed under certain conditions. Specifically, the LED (72) is turned on after the damper (82) is opened in the dust transfer operation, and luminous intensity of light emitted by the LED (72) is detected. If the luminous intensity is equal to or less than a predetermined value, it is considered that the dust in the dust storage container (60) is not transferred by the air blown by the indoor fan (21), i.e., that the transfer path from the dust storage container (60) to the dust collecting box (90) is clogged with dust, or that the dust collecting box (90) is filled with a large amount of dust. The LED (16) on the decorative panel (11) is turned on to inform the user about the situation, and the dust discharge operation as described below is performed according to the instruction from a remote controller etc. The above operation of detecting the luminous intensity of light emitted by the LED (72) (hereinafter also referred to as "operation of detecting the state of being filled or clogged with dust") that is linked with the movement of the damper (82) is performed regularly, e.g., once a week.

In the dust discharge operation, the rotating brush (51) is stopped at the position as shown in FIG. 11 (A), and the air filter (30) is stopped as well, as in the above-described dust transfer operation. Further, the damper (82) of the damper box (81) is in the closed state (the state as shown in FIG. 13 (C)).

In this state, the nozzle (150) of the cleaner is inserted, by the user, in the nozzle insertion portion (110) on the decorative panel (11) for suction. As a result of the suction, the dust in the dust collecting box (90) is suctioned by the cleaner through the transfer duct (88), the dust storage container (60), the damper box (81), the suction duct (87), and the nozzle insertion portion (110). The dust remaining in the dust storage container (60) is simultaneously suctioned by the cleaner through the suction duct (87). As a result, the dust in the dust collecting box (90) and the dust storage container (60) is discharged out of the indoor unit (3).

Further, once it is determined that the luminous intensity is lower than a predetermined value, the above operation of detecting the state of being filled or clogged with dust is performed regularly at predetermined intervals until clogging with dust is eliminated by the dust discharge operation and the dust in the dust collecting box (90) is reduced to a small amount, i.e., until the luminous intensity of the light emitted by the LED (72) is equal to or greater than the predetermined value. When the luminous intensity becomes equal to or greater than the predetermined value, the LED (16) on the decorative panel (11) is turned off. After that, a general operation of detecting the state of being filled or clogged with dust is performed, for example, once a week.

Effects of Embodiments

As described above, according to the present embodiment, the indoor unit (3) of the air conditioner (1) is constituted by the chamber casing (101) connected to a room side of the main unit (10) including the indoor heat exchanger (22) and the indoor fan (21), the air filter (30) provided in the chamber casing (101) on an intake side of the indoor fan (21), and the dust removal device (50) for removing dust captured by the air filter (30). Thus, if the cleaning unit (100) is not necessary, the indoor unit can be constituted by the main unit (10) and the decorative panel (11), and at the same time, it is easy to add the cleaning unit (100) to the indoor unit.

Moreover, the electrical component box (105) dedicated to the cleaning unit (100) is provided in the cleaning unit (100), separate from the electrical component box (20) provided in the main unit (10). Therefore, only the electrical component boxes (20, 105) may be electrically connected to each other so as to be capable of signal transmission. This makes it easier to add or omit the cleaning unit (100) to or from the indoor unit, compared to the case where both of the main unit (10) and the cleaning unit (100) are controlled by electrical components in one electrical component box. Further, the operations of the main unit (10) and the cleaning unit (100) can be linked by the electrically connected electrical component boxes (20, 105) capable of signal transmission as described above.

Further, the provision of the above-described cleaning unit (100) enables the dust captured by the air filter (30) to be removed by the dust removal device (50), and after that, to be transferred by the dust transfer device (80) and stored in the dust collecting box (90). This can reduce the work of cleaning the air filter (30) by the user. Moreover, the nozzle insertion portion (110) for inserting the nozzle (150) of the cleaner is provided to the decorative panel (11) located on the room side of the indoor unit (3), and the nozzle insertion portion (110) and the dust collecting box (90) are connected to each other through the dust storage container (60). Therefore, the dust in the dust collecting box (90) and the dust storage container (60) can be efficiently suctioned with the nozzle (150) of the cleaner.

Further, the transfer duct (88) extending from the dust storage container (60) is connected to one end of the dust collecting box (90), and the other end of the dust collecting box (90) is provided with the discharge opening (91) which is open toward the outside of the chamber casing (101) of the cleaning unit (100). This structure allows the air introduced through the dust transfer device (80) by the air blown by the indoor fan (21) to flow efficiently into the dust collecting box (90). As a result, the dust in the dust storage container (60) can be reliably transferred to the dust collecting box (90) and stored therein efficiently.

Further, hooks (145) are provided on the bottom side of the main unit (10), and U-shaped fittings (146) for temporary hanging are provided on the top surface of the partition plate (25) of the cleaning unit (100). Thus, when the cleaning unit (100) is attached to the bottom side of the main unit (10) after the main unit (10) is fixed to the wall above the ceiling, the fittings (146) for temporary hanging of the cleaning unit (100) can be engaged with the hooks (145) of the main unit (10). It is therefore easy to attach the cleaning unit (100) to the main unit (10). Here, the portions where the hooks (145) and the fittings (146) for temporary hanging are engaged with each other are hidden from view because of the partition plate (25) of the cleaning unit (100). However, the provision of the transparent portions (147) near the fittings (146) for temporary hanging provided on the partition plate (25) allows a visual check of the engagement portions from below during engagement. This can improve the efficiency of work.

Further, the dust storage container (60) is rotatably provided in the cleaning unit (100). The electrical component box (105) and the dust collecting box (90) are disposed so as not to overlap with the dust storage container (60). The service hole (25a) to be covered by the service cover (106) is formed at a location above the dust collecting box (90). The electrical component box (20) is disposed in the main unit (10) so as to correspond to the service hole (25a). This structure allows easy access to the electrical component box (20) in the main unit (10) for maintenance by rotating the dust storage container (60) and removing the dust collecting box (90), the service cover (106), and the air filter (30). Consequently, due to the above structure, the efficiency in providing maintenance for the electrical component box (20) in the main unit (10) can be improved.

Moreover, the transfer duct (88) which connects between the dust storage container (60) and the dust collecting box (90) is connected to the dust storage container (60) and the dust collecting box (90) at the connecting portions (107, 108). The flexible duct (87b) which connects between the dust storage container (60) and the nozzle insertion portion (110) is connected to the dust storage container (60) and the nozzle insertion portion (110) at the connecting portions (109, 131). The connecting portions (107, 108) and the connecting portions (109, 131) are configured to have a detachable structure, and therefore, the ducts (88, 87b) can be easily attached or detached for maintenance. As a result, working efficiency can be improved.

Other Embodiments

The following structures may be used in the above embodiment.

In the above embodiment, the dust removed from the air filter (30) is collected in the dust collecting box (90). However, the structure is not limited to this structure, but any structure, such as a bag-like structure, is possible as long as dust can be collected.

Further, in the above embodiment, the dust collecting box (90) is provided in the cleaning unit (100). However, the structure is not limited to this structure, but dust collecting box (90) may be provided separately from the indoor unit (3).

Further, in the above embodiment, air blown by the indoor fan (21) is used to transfer dust from the dust storage container (60) to the dust collecting box (90). However, the structure is not limited to this structure, but any structure is possible as long as dust can be transferred. The structure may include a dedicated fan.

Further, in the above embodiment, the air filter (30) has a circular shape. However, the structure is not limited to this structure, but the air filter (30) may have a rectangular shape, for example. In this case, the air filter (30) and the rotating brush (51) relatively move in a linear manner.

INDUSTRIAL APPLICABILITY

As described above, the present invention is particularly useful for an indoor unit of an air conditioner in which an air filter is provided on the intake side of an indoor fan.

The invention claimed is:

1. A cleaning unit of an air conditioner, comprising:
a chamber casing detachably connected directly to a room side exterior casing of an indoor main unit using connecting members, the indoor main unit having an indoor heat exchanger and an indoor fan which draws air from a room and blows the air to the indoor heat exchanger;
an air filter provided in the chamber casing on an intake side of the indoor fan;
a dust removal device configured to remove dust captured by the air filter, and a cleaning unit electrical component box contained within the chamber casing in which an electrical component for controlling a component part of the cleaning unit is accommodated, wherein
the cleaning unit electrical component box is electrically connected to an indoor main unit electrical component box located within the indoor main unit such that transmission of an electric signal is possible between the cleaning unit electrical component box and the indoor main unit electrical component box.

2. The cleaning unit of the air conditioner of claim 1, wherein the chamber casing includes a dust collecting device located in an area outside the air filter in plan view, for collecting the dust removed by the dust removal device.

3. The cleaning unit of the air conditioner of claim 2, further comprising a dust transfer device configured to transfer the dust removed by the dust removal device to the dust collecting device.

4. The cleaning unit of the air conditioner of claim 3, wherein the dust transfer device transfers the dust to the dust collecting device by utilizing the air blown by the indoor fan.

5. The cleaning unit of the air conditioner of claim 4, wherein the dust collecting device is provided with a receiving opening into which the air blown by the indoor fan flows together with the dust, and a discharge opening for discharging the blown air to the outside, and
a filter is disposed on an upstream side of the discharge opening.

6. The cleaning unit of the air conditioner of claim 5, wherein
the dust collecting device has a box-like shape, and
the discharge opening is formed in one side portion of the dust collecting device,
and the receiving opening is formed in another side portion of the dust collecting device.

7. The cleaning unit of the air conditioner of any one of claims 1-6, wherein the dust removal device includes a dust removal section for removing the dust captured by the air filter, and a storage section for collecting the dust removed by the dust removal section.

8. The cleaning unit of the air conditioner of claim 1, wherein the dust removal device is configured to be capable of moving between a dust removal position at which the dust removal device overlaps with the air filter in plan view, and a maintenance position at which the dust removal device does not overlap with the air filter in plan view.

9. The cleaning unit of the air conditioner of claim 8, wherein
the air filter has a circular shape in plan view, and
the dust removal device is arranged to extend in a radial direction of the air filter, and to rotate at an end of the dust removal device located radially outside the air filter.

10. The cleaning unit of the air conditioner of claim 1, wherein
an engagement portion to be engaged with a protrusion portion provided on a bottom side of a casing of the indoor main unit, is provided on a partition plate which covers a top side of the chamber casing, and
the partition plate is provided with a transparent portion which allows a visual check of the engagement portion between the protrusion portion and the engagement portion from under the partition plate.

11. The cleaning unit of the air conditioner of claim 1, wherein
the air filter has a circular shape in plan view,
the chamber casing includes a dust collecting device in an area outside the circular air filter in plan view, for collecting the dust removed by the dust removal device,
the dust removal device is arranged to extend in a radial direction of the circular air filter, and to rotate at an end of the dust removal device that is located radially outside the circular air filter,
the dust collecting device is disposed below a partition plate covering a top side of the chamber casing, in the area outside the air filter in plan view and outside an area where the dust removal device rotates, and
the partition plate located above the dust collecting device is provided with an opening to be covered with a cover member.

12. The cleaning unit of the air conditioner of claim 1, further comprising:
a dust collecting device for collecting the dust removed by the dust removal device, wherein
the dust collecting device is connected to the dust removal device through a duct which constitutes a transfer path, and
the duct is detachably connected to at least one of the dust collecting device and the dust removal device.

* * * * *